US012651557B2

(12) United States Patent
Xie et al.

(10) Patent No.: US 12,651,557 B2
(45) Date of Patent: Jun. 9, 2026

(54) DISPLAY PANEL AND DISPLAY APPARATUS

(71) Applicant: Tianma Advanced Display Technology Institute (Xiamen) Co., Ltd., Xiamen (CN)

(72) Inventors: Mengmeng Xie, Xiamen (CN); Tianyi Wu, Xiamen (CN); Wenxin Jiang, Xiamen (CN)

(73) Assignee: Tianma Advanced Display Technology Institute (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 18/959,700

(22) Filed: Nov. 26, 2024

(65) Prior Publication Data

US 2026/0051281 A1 Feb. 19, 2026

(30) Foreign Application Priority Data

Aug. 16, 2024 (CN) ......................... 202411127690.7

(51) Int. Cl.
*G09G 3/3233* (2016.01)
*G09G 3/32* (2016.01)

(52) U.S. Cl.
CPC ....... *G09G 3/32* (2013.01); *G09G 2300/0426* (2013.01); *G09G 2300/0842* (2013.01);
(Continued)

(58) Field of Classification Search
CPC ............. G09G 3/32; G09G 2300/0426; G09G 2300/0842; G09G 2300/0861;
(Continued)

(56) References Cited

U.S. PATENT DOCUMENTS

| | | | |
|---|---|---|---|
| 11,361,713 | B1 | 6/2022 | Fu |
| 2022/0028317 | A1 | 1/2022 | Kim et al. |

(Continued)

FOREIGN PATENT DOCUMENTS

| | | | |
|---|---|---|---|
| CN | 113471225 | A | 10/2021 |
| CN | 114005411 | A | 2/2022 |

(Continued)

OTHER PUBLICATIONS

The First Office Action dated Sep. 3, 2025 for Chinese Application No. 202411127690.7 , 22 pages.

(Continued)

*Primary Examiner* — Dennis P Joseph
(74) *Attorney, Agent, or Firm* — East IP P.C.

(57) ABSTRACT

The present application discloses a display panel and a display apparatus. The display panel includes: a light-emitting element; and a pixel circuit and a driving circuit, the driving circuit providing a control signal for the pixel circuit, and the pixel circuit being electrically connected to the light-emitting element; wherein the display panel comprises a first area and a second area, the pixel circuit comprises a first pixel circuit located in the first area and a second pixel circuit located in the second area, a length of the first pixel circuit in a first direction being less than a length of the second pixel circuit in the first direction; the driving circuit comprises a first driving circuit, the first driving circuit comprising a plurality of first shift registers cascaded along a second direction, the first direction intersecting with the second direction.

19 Claims, 29 Drawing Sheets

(52) U.S. Cl.
CPC ............... *G09G 2300/0861* (2013.01); *G09G 2310/0286* (2013.01); *G09G 2320/0223* (2013.01); *G09G 2320/0233* (2013.01)

(58) Field of Classification Search
CPC ... G09G 2310/0286; G09G 2320/0223; G09G 3/3233; G09G 3/3266
See application file for complete search history.

(56) References Cited

U.S. PATENT DOCUMENTS

| | | | | |
|---|---|---|---|---|
| 2023/0222969 | A1* | 7/2023 | Peng | G09G 3/32 345/55 |
| 2024/0347010 | A1* | 10/2024 | Zhang | G09G 3/20 |

FOREIGN PATENT DOCUMENTS

| | | | |
|---|---|---|---|
| CN | 117153106 | A | 12/2023 |
| CN | 117352530 | A | 1/2024 |

OTHER PUBLICATIONS

The extended European search report dated Jan. 2, 2026 for European Application No. 25196061.3 , 20 pages.

* cited by examiner

DISPLAY PANEL AND DISPLAY APPARATUS

CROSS-REFERENCE TO RELATED APPLICATIONS

This application claims priority to Chinese Patent Application No. 202411127690.7, titled "DISPLAY PANEL AND DISPLAY APPARATUS" and filed on Aug. 16, 2024, which is hereby incorporated by reference in its entirety.

TECHNICAL FIELD

The present application relates to the field of display technology, and in particular to a display panel and a display apparatus.

BACKGROUND

A display panel is a main component of a display apparatus to realize the image display function. In the display panel, the light-emitting element used for image display is connected to the pixel circuit, and the pixel circuit is connected to the driving circuit. The pixel circuit can respond to the control of the driving circuit and control the light-emitting element to display the image.

In conventional display panels, the driving circuits are generally disposed in a border area of the display panel. Therefore, in conventional display panels, the border area needs to be disposed on one side of the display panel for disposing the driving circuits, resulting in a display panel with a relatively large width of the border area.

SUMMARY

In view of the above problems, the present application provides a display panel and a display apparatus to achieve the purpose of narrow border or even borderless border.

The specific scheme is as follows.

A first aspect of the present application provides a display panel, including:

a light-emitting element; and a pixel circuit and a driving circuit, the driving circuit providing a control signal for the pixel circuit, and the pixel circuit being electrically connected to the light-emitting element, wherein the display panel comprises a first area and a second area, the pixel circuit comprises a first pixel circuit located in the first area and a second pixel circuit located in the second area, a length of the first pixel circuit in a first direction being less than a length of the second pixel circuit in the first direction;

the driving circuit comprises a first driving circuit, the first driving circuit comprising a plurality of first shift registers cascaded along a second direction, the first direction intersecting with the second direction, wherein in the second direction, the first shift register and the light-emitting element at least partially overlap.

A second aspect of the present application provides a display apparatus, including a display panel including: a light-emitting element; and a pixel circuit and a driving circuit, the driving circuit providing a control signal for the pixel circuit, and the pixel circuit being electrically connected to the light-emitting element;

wherein the display panel comprises a first area and a second area, the pixel circuit comprises a first pixel circuit located in the first area and a second pixel circuit located in the second area, a length of the first pixel circuit in a first direction being less than a length of the second pixel circuit in the first direction;

the driving circuit comprises a first driving circuit, the first driving circuit comprising a plurality of first shift registers cascaded along a second direction, the first direction intersecting with the second direction, wherein in the second direction, the first shift register and the light-emitting element at least partially overlap.

BRIEF DESCRIPTION OF THE DRAWINGS

In order to more clearly illustrate the technical solutions in the embodiments of the present application or related technologies, the following will briefly introduce the drawings required for use in the embodiments or prior art descriptions, apparently, the drawings described below are only embodiments of the present application. For those skilled in this art, other drawings can be obtained based on the provided drawings without creative work.

The structures, proportions, sizes, etc. shown in the drawings of this specification are only used to match the contents disclosed in the specification for people familiar with this technology to understand and read, and are not used to limit the restrictive conditions that can be implemented in the present application. Therefore, they have no technical substantive significance. Any structural modification, change in proportional relationship or adjustment of size should still fall within the scope of the technical content disclosed in the present application without affecting the effects and purposes that can be achieved by the present application.

DETAILED DESCRIPTION

The embodiments in the present application will be described clearly and completely below in conjunction with the drawings in the embodiments of the present application. It is known to those skilled in the art that with the development of technology and the emergence of new scenarios, the technical solutions provided in the embodiments of the present application are also applicable to similar technical problems.

Apparently, the described embodiments are only part of the embodiments of the present application, rather than all of the embodiments. Based on the embodiments in the present application, all other embodiments obtained by those skilled in the field without creative work are within the scope of protection of the present application. The terms used in the embodiments of the present application are only used to explain the specific embodiments of the present application, and are not intended to limit the present application.

In order to make the above-mentioned purposes, features and advantages of the present application more obvious and easy to understand, the present application is further described in detail below in combination with the drawings and specific embodiments.

Figure 1:
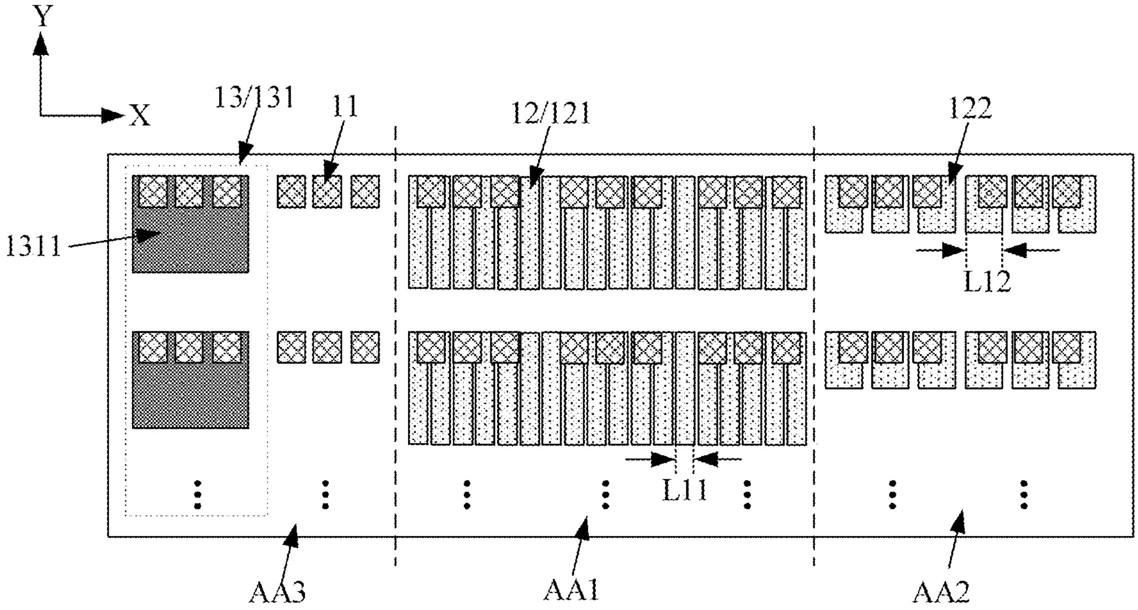
FIG. 1 is a top view of a display panel provided in an embodiment of the present application.
Figure 2:
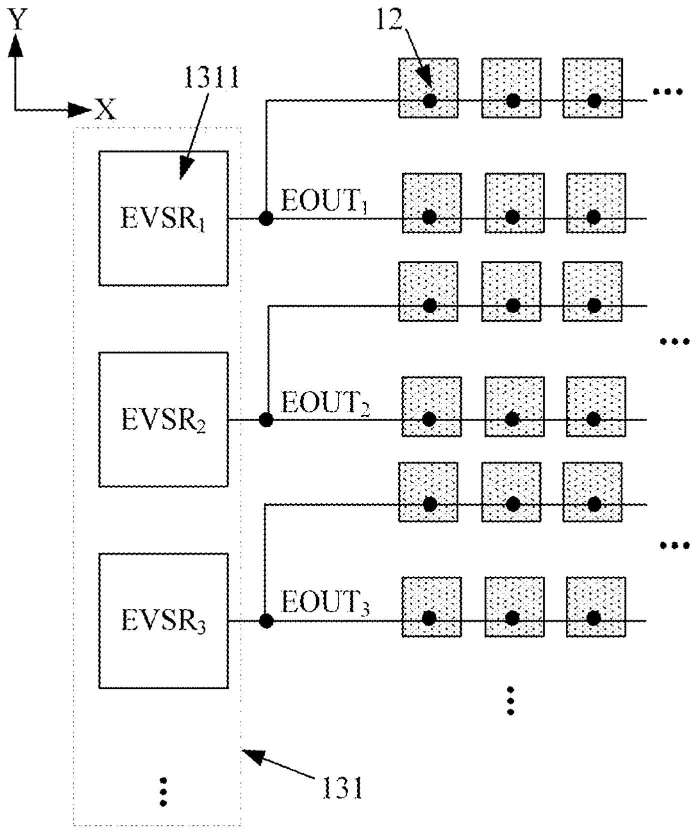
FIG. 2 is a schematic diagram of a circuit connection relationship of a first driving circuit.

Referring to FIGS. 1 and 2, FIG. 1 is a top view of a display panel provided by an embodiment of the present application, and FIG. 2 is a schematic diagram of a circuit connection relationship of a first driving circuit, wherein the display panel includes:

- a light-emitting element 11;
- a pixel circuit 12 and a driving circuit 13, the driving circuit 13 provides control signals for the pixel circuit 12, and the pixel circuit 12 is electrically connected to a light-emitting element 11;
- the display panel includes a first area AA1 and a second area AA2, the pixel circuit 12 includes a first pixel circuit 121 located in the first area AA1 and a second pixel circuit 122 located in the second area AA2, and a length L11 of the first pixel circuit 121 in a first direction X is less than a length L12 of the second pixel circuit 122 in the first direction X, that is, L11<L12;
- the driving circuit 13 includes a first driving circuit 131, and the first driving circuit 131 includes a plurality of first shift registers 1311 cascaded along a second direction Y, and the first direction X and the second direction Y intersect with each other,
- wherein in the second direction Y, the first shift register 1311 at least partially overlaps the light-emitting element 11.

The first direction X and the second direction Y are both parallel to a plane where the display panel is located, and the two may be perpendicular, or intersecting and not perpendicular. Optionally, the display panel has a plurality of light-emitting elements 11 arranged in an array, and one of the first direction X and the second direction may be set as a row direction of the array, and the other may be set as a column direction of the array, such as the first direction X is the row direction, and the second direction Y is the column direction.

Since L11<L12, the arrangement space occupied by the first pixel circuits 121 in the first direction X can be reduced, so that more pixel circuits 12 can be arranged in the first area AA1, and the pixel circuits 12 in other areas (such as the third area AA3 described below) can be moved to the first area AA1, thereby saving for the space for arranging the first driving circuits 131 in the third area AA3.

In the display panel provided in the embodiments of the present application, since L11<L12, the arrangement space occupied by the first pixel circuits 121 in the first direction X can be reduced, so as to save for the space for arranging the first driving circuits 131 in the display area of the display panel, and the first shift register 1311 of the first driving circuit 131 and the light-emitting element 11 at least partially overlap in the second direction Y, so that at least part of the driving circuits 13 can be arranged in the display area, and the border area formed by the driving circuits 13 in the first direction X can be reduced. Therefore, in the technical solution of the present application, the border width of the display panel in the first direction X can be reduced, thereby even realizing a borderless design of the display panel in the first direction X.

The length of the pixel circuit 12 in the first direction X can be the length occupied by active regions of all transistors in the pixel circuit 12 in the first direction X.

In some embodiments, redundant positions are designed in the display panel so that when some light-emitting elements 11 may fail, new light-emitting elements 11 can be added to the redundant positions to maintain normal display, and the failed light-emitting elements 11 can be removed or not. In some embodiments, the redundant positions may not be designed in the display panel, and the failed light-emitting elements 11 are directly removed, and new light-emitting elements 11 are added to the original position after removal, so as to ensure the normal display of the display panel.

As shown in FIG. 2, in the first driving circuit 131, there are n first shift registers 1311 cascaded in sequence in the second direction Y, where n is a positive integer greater than 1. Along the second direction Y, the n first shift registers 1311 are $EVSR_1$, $EVSR_2$, $EVSR_3$, . . . , $EVSR_n$ in sequence, and output signals of the n first shift registers 1311 are $EOUT_1$, $EOUT_2$, $EOUT_3$, . . . . $EOUT_n$ in sequence. The n first shift registers 1311 are arranged in sequence along the second direction Y, and the output of the front first shift register 1311 is used as the input of the next first shift register 1311 to realize the sequential cascading of each first shift register 1311.

Optionally, the output signal EOUT of the first shift register 1311 can be used as the light-emitting control signal EMIT.

In an arrangement shown in FIG. 2, each two rows of pixel circuits 12 are connected to a first shift register 1311 correspondingly, the first shift register 1311 at each stage simultaneously provides control signals for two adjacent rows of pixel circuits 12, and the first shift register 1311 at each stage drives two rows of pixel circuits 12 correspondingly.

In the embodiments of the present application, the display area of the display panel can be divided into a plurality of sub-display areas sequentially distributed in the first direction X, and different sub-display areas do not overlap each other. At least one sub-display area is used as the first area AA1, at least one sub-display area is used as the second area AA2, and at least one sub-display area is used as the third area AA3. The first area AA1, the second area AA2, and the third area AA3 are different sub-display areas.

Since L11<L12, the arrangement space occupied by the first pixel circuits 121 in the first direction X can be reduced, so that more pixel circuits 12 can be arranged in the first area AA1, so the pixel circuits 12 connected to the light-emitting elements 11 in the third area AA3 can be used as the first pixel circuits 121 arranged in the first display area AA1. If the light-emitting elements 11 in the first area AA1 and the third area AA3 are respectively connected to the first pixel circuits 121 in the first area AA1 in a correspondence, it is equivalent to moving the pixel circuits 12 in the third area AA3 to the first area AA1, and there is no need to arrange the pixel circuits 12 in the third area AA3, thereby vacating for the space for arranging the first driving circuits 131 in the third area AA3, and at least part of the driving circuits 13 can be arranged in the third area AA3, so the border width of the display panel in the first direction X can be reduced, thereby even realizing a borderless design of the display panel in the first direction X.

Figure 3A:
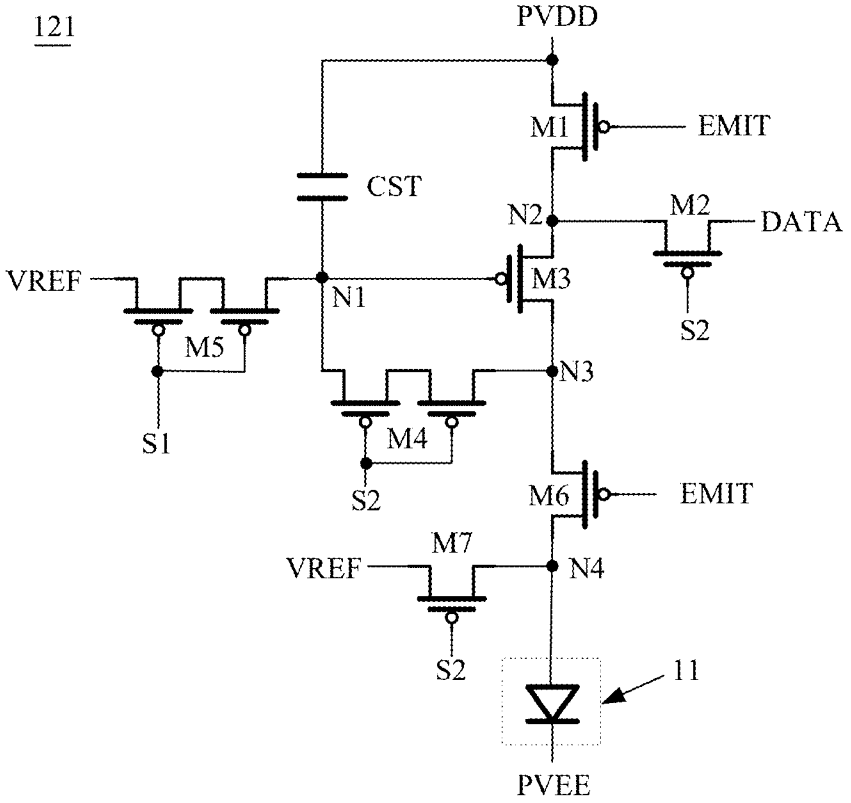
FIG. 3A is a schematic diagram of a circuit connection relationship of a pixel circuit provided in an embodiment of the present application.
Figure 3B:
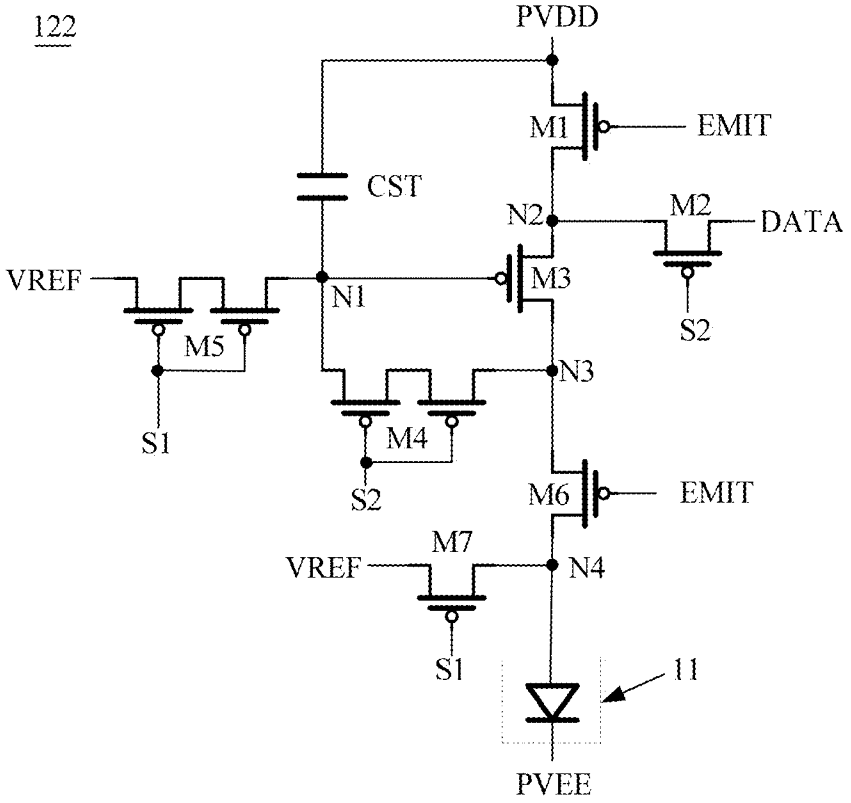
FIG. 3B is a schematic diagram of a circuit connection relationship of a second pixel circuit provided in an embodiment of the present application.

Referring to FIGS. 3A and 3B, FIG. 3A is a schematic diagram of a circuit connection relationship of a first pixel circuit provided in an embodiment of the present application, and FIG. 3B is a schematic diagram of a circuit connection relationship of a second pixel circuit provided in an embodiment of the present application. On the basis of any one of the above embodiments, the pixel circuit 12 may include a driving transistor M3, a gate of the driving transistor M3 is connected to a first node N1, a first electrode is connected to a second node N2, and a second electrode is connected to a third node N3.

Further, as shown in FIG. 3A and FIG. 3B, the pixel circuit 12 also includes a first light-emitting control transistor M1 and a second light-emitting control transistor M6, both of which are turned on in the light-emitting stage, and the driving transistor M3 is turned on to provide a driving current for the light-emitting element 11, so that the light-emitting element 11 can emit light and display. The gates of the first light-emitting control transistor M1 and the second light-emitting control transistor M6 are both connected to the light-emitting control signal EMIT. The first electrode of the first light-emitting control transistor M1 is connected to the first power supply voltage PVDD, and the second electrode is connected to the second node N2. The first electrode of the second light-emitting control transistor M6 is connected to the third node N3, and the second electrode is connected to the fourth node N4.

The first electrode of the light-emitting element 11 is connected to the fourth node N4, and the second electrode is connected to the second power supply voltage PVEE. If the first power supply voltage PVDD is at a high level and the second power supply voltage PVEE is at a low level, the fourth node N4 is connected to the anode of the light-emitting element 11, otherwise, the fourth node N4 is connected to the cathode of the light-emitting element 11.

Further, as shown in FIG. 3A and FIG. 3B, the pixel circuit 12 also includes a first reset transistor M5, the first reset transistor M5 is used to reset the voltage of the first node N1 in the reset stage. The gate of the first reset transistor M5 is connected to the first scanning signal S1, the first electrode is connected to the reset signal VREF, and the second electrode is connected to the first node N1.

Further, as shown in FIG. 3A and FIG. 3B, the pixel circuit 12 also includes a threshold compensation transistor M4, the threshold compensation transistor M4 is used to perform threshold compensation on the driving transistor M3. The gate of the threshold compensation transistor M4 is connected to the second scanning signal S2, the first electrode is connected to the first node N1, and the second electrode is connected to the third node N3.

Further, as shown in FIG. 3A and FIG. 3B, the pixel circuit 12 also includes a data writing transistor M2, which is used to be turned on in the data writing stage and write the data signal DATA to the second node N2. The gate of the data writing transistor M2 is connected to the second scanning signal S2, the first electrode is connected to the second node N2, and the second electrode is connected to the data signal DATA.

Further, as shown in FIGS. 3A and 3B, the pixel circuit 12 also includes a second reset transistor M7, the second reset transistor M7 is used to reset the voltage of the fourth node N4 in the reset stage. The gate of the second reset transistor M7 is connected to the scanning signal, the first electrode is connected to the reset signal VREF, and the second electrode is connected to the fourth node N4. In the first pixel circuit 121, the second reset transistor M7 is connected to the second scanning signal S2 as shown in FIG. 3A; in the second pixel circuit 122, the second reset transistor M7 is connected to the first scanning signal S1 as shown in FIG. 3B.

In the pixel circuit 12, a storage capacitor CST is also connected between the first node N1 and the first electrode of the first light-emitting control transistor M1.

In the embodiments of the present application, taking an example that the first reset transistor M5 and the threshold compensation transistor M4 are dual-gate transistors for illustration, and in other ways, the two can also be single-gate transistors. Each transistor in the pixel circuit 12 can be a PMOS, which is turned on when the gate voltage is at a low level and turned off when the gate voltage is at a high level. In other ways, the transistors in the pixel circuit 12 can also be set to a NMOS. NMOS is turned off when the gate voltage is at a low level and turned on when the gate voltage is at a high level.

In FIGS. 3A and 3B, taking an example that the pixel circuit 12 is a 7T1C circuit structure as an example for illustration, that is, the pixel circuit 12 consists of 7 transistors and 1 capacitor. The pixel circuit 12 is not limited to the 7T1C circuit structure, and the control accuracy of the light-emitting element 11 can also be improved by adding capacitors or transistors.

Figure 4:
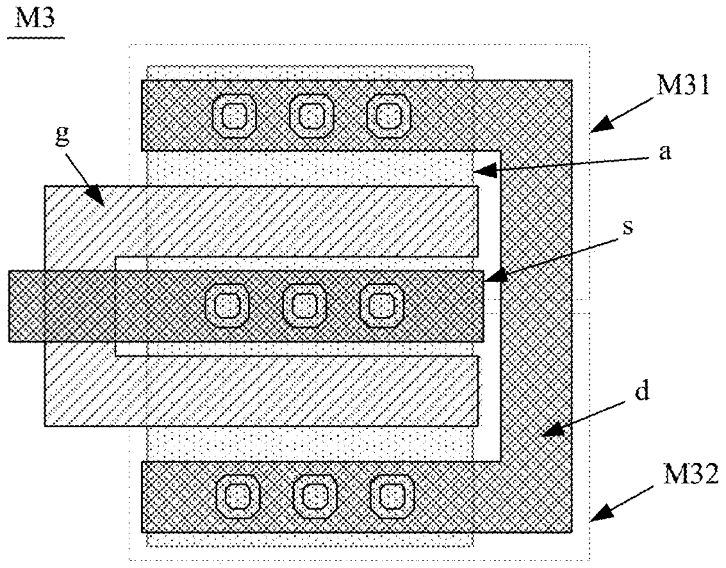
FIG. 4 is a layout of a driving transistor provided in an embodiment of the present application.

Referring to FIG. 4, FIG. 4 is a layout of a driving transistor provided in an embodiment of the present application. On the basis of any one of the above-mentioned embodiments, the pixel circuit 12 may include a driving transistor M3, and the driving transistor M3 may include at least a first sub-transistor M31 and a second sub-transistor M32. The gate g of the first sub-transistor M31 is connected to the gate g of the second sub-transistor M32, the first electrode s of the first sub-transistor M31 is connected to the first electrode s of the second sub-transistor M32, and the second electrode d of the first sub-transistor M31 is connected to the second electrode d of the second sub-transistor M32.

In an arrangement shown in FIG. 4, the driving transistor M3 is provided to have a plurality of sub-transistors, the gates g of the plurality of sub-transistors are connected, the first electrodes s of the plurality of sub-transistors are connected, and the second electrodes d of the plurality of sub-transistors are connected, so that the plurality of sub-transistors are connected in parallel with each other, which may improve the channel width-to-length ratio of the driving transistor M3 and improve the driving capability of the driving transistor M3. One of the first electrode s and the second electrode d of the transistor is a source electrode, and the other is a drain electrode d.

In the same driving transistor M3, each sub-transistor has a source region a, and the first electrode s and the second electrode d of the sub-transistor are electrically connected to the active region a below through corresponding vias, and the positions of the vias can be disposed according to the circuit layout requirements. In a direction parallel to the plane where the active region a is located, the area where the gate g of the same sub-transistor overlaps the active region is the channel region of the sub-transistor. The first electrode s and the second electrode d are located in the same metal layer, and are located in a different metal layer from the gate g, and there is an insulating layer between different metal layers.

In FIG. 4, taking an example that the driving transistor M3 has two sub-transistors for illustration. It should be noted that the driving transistor M3 may include 2 or any number of sub-transistors according to requirements, which is not limited to the implementation with two sub-transistors shown in FIG. 4. The number of sub-transistors in the driving transistor M3 is not limited in the embodiments of the present application.

Figure 5:
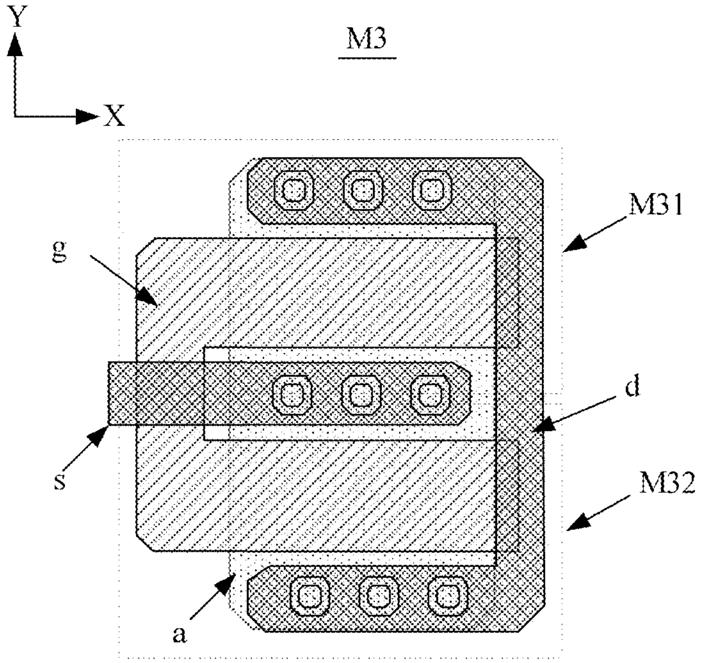
FIG. 5 is a layout of a driving transistor in a first pixel circuit provided in an embodiment of the present application.
Figure 6:
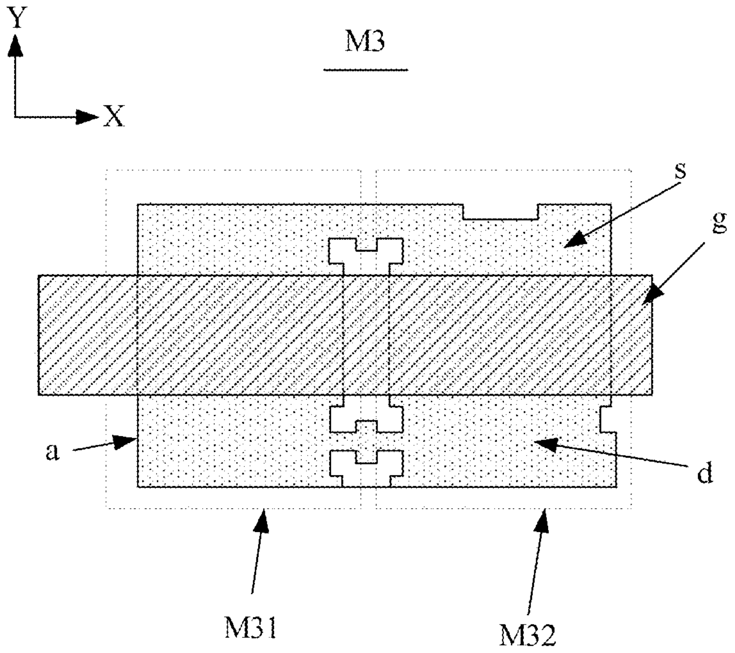
FIG. 6 is a layout of a driving transistor in a second pixel circuit provided in an embodiment of the present application.

Referring to FIG. 5 and FIG. 6, FIG. 5 is a layout of a driving transistor in a first pixel circuit provided in an embodiment of the present application, and FIG. 6 is a layout of a driving transistor in a second pixel circuit provided in an embodiment of the present application. Based on the above implementation, as shown in FIG. 5, in the first pixel circuit 121, the first sub-transistor M31 and the second sub-transistor M32 are arranged along the second direction Y; as shown in FIG. 6, in the second pixel circuit 122, the first sub-transistor M31 and the second sub-transistor M32 are arranged along the first direction X.

The driving transistor M3 shown in FIG. 5 can be used in the layout of the first pixel circuit 121 shown in FIG. 8 in the following implementation. The driving transistor M3 shown in FIG. 6 can be used in the layout of the first pixel circuit 121 shown in FIG. 9 in the following implementation. The source-drain metal layer and the corresponding vias connected to the first and second electrodes of the sub-transistor are not shown in FIG. 6.

In the first area AA1, since more pixel circuits 12 need to be arranged in the first direction X, the lengths of the pixel circuits 12 in the first area AA1 need to be compressed in the first direction X. In the first pixel circuit 121, since the first sub-transistor M31 and the second sub-transistor M32 in the same driving transistor M3 are arranged along the second direction Y, the lengths of the first pixel circuits 121 in the first direction X can be reduced, thereby saving for the arrangement space of the first pixel circuits 121 in the first area AA1 in the first direction X, so that more first pixel circuits 121 can be arranged in the first area AA1.

In the second area AA1, since there is no need to arrange the pixel circuits 12 in other areas, there is enough space in the second area AA2 in the first direction X to arrange the second pixel circuits 122. In the second pixel circuit 122, since the first sub-transistor M31 and the second sub-transistor M32 in the same driving transistor M3 are arranged along the first direction X, the size of the second pixel circuits 122 in the second direction Y may not be increased, and the length of the pixel circuit 12 in the second area AA2 in the second direction Y can be shorter.

In some embodiments, the embodiments of the present invention can be applied to transparent display. In addition, as described in the following embodiments, if the display panel is a transparent display panel, the first sub-transistor M31 and the second sub-transistor M32 in the second pixel circuit 122 are arranged along the first direction X, and the transparent area in the second area AA2 can also have a relatively large area.

Figure 7:
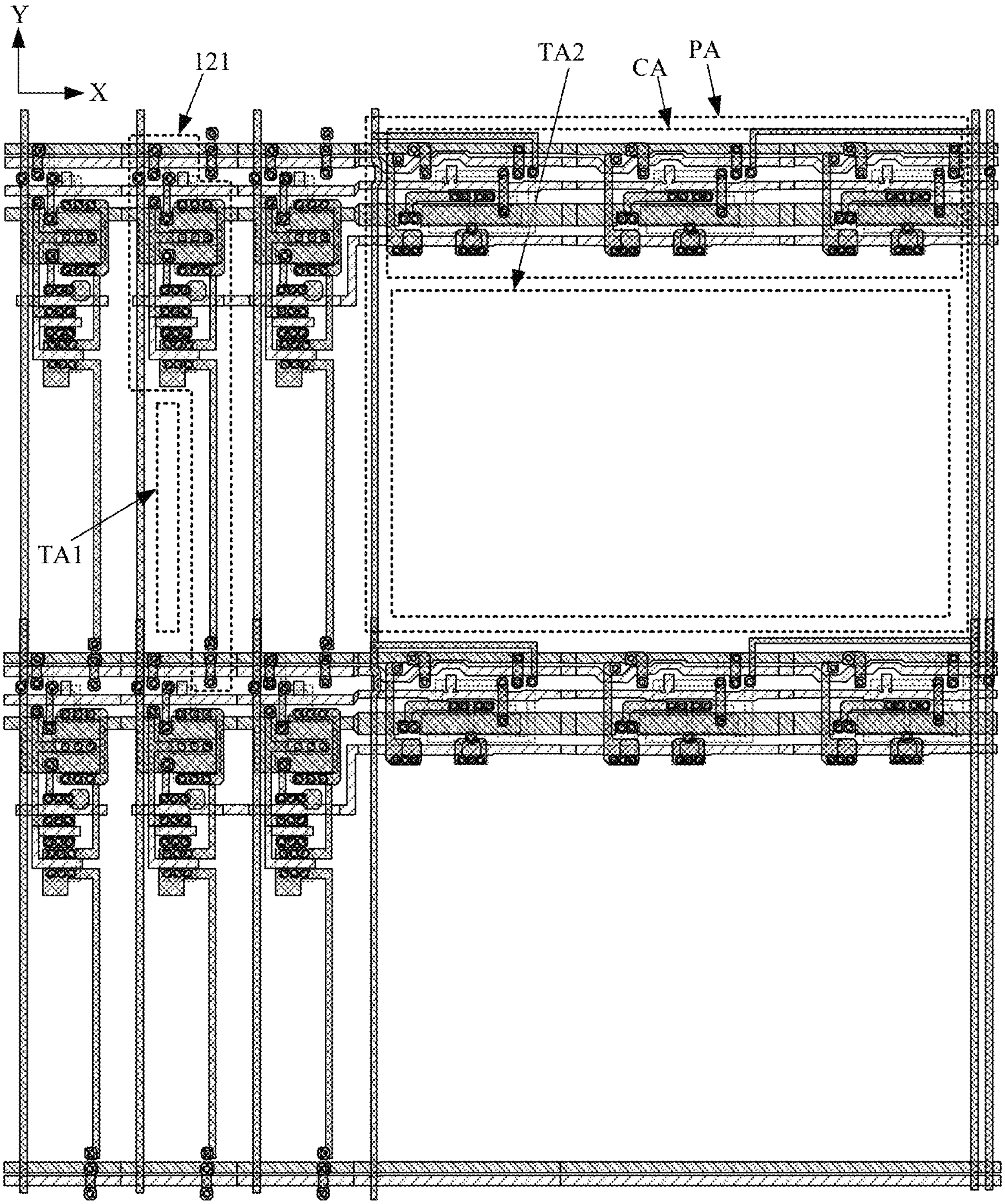
FIG. 7 is a layout of a pixel circuit in a display panel provided in an embodiment of the present application.

When the display panel is used as a transparent display panel, the layout of the circuit board in the transparent display panel can be as shown in FIG. 7.

Referring to FIG. 7, FIG. 7 is a layout of a pixel circuit in a display panel provided in an embodiment of the present application, and FIG. 7 shows two rows of pixel circuits 12, each row showing six pixel circuits 12 arranged continuously in the first direction X. In the same row, the three pixel circuits 12 on the left side are the first pixel circuits 121 located in the first area AA1, and the three pixel circuits 12 on the right side are the second pixel circuits 122 located in the second area AA2.

As shown in FIG. 7, the display panel may have a plurality of pixel areas PA, and the pixel areas PA include a circuit area CA and a transparent area TA. In the first area AA1, the transparent area TA is the first transparent area TA1; in the second area AA2, the transparent area TA is the second transparent area TA2. The first pixel circuit 121 and the second pixel circuit 122 are located in the corresponding circuit area CA.

In the embodiments of the present application, by designing the layout design of each transistor in the pixel circuit 12, the transparent areas can be formed in the pixel areas PA in the first area AA1 and the second area AA2 respectively to achieve transparent display.

Optionally, the display panel has a plurality of pixel areas PA arranged in an array, each pixel area PA has a pixel, and the pixel can be disposed to include three light-emitting elements 11 with different light-emission colors arranged in sequence in the first direction X, and the three light-emitting elements 11 can emit red light, green light and blue light respectively.

In the second area AA2, the second pixel circuit 122 is a normal pixel circuit that does not need to be compressed in the length in the first direction X. Each pixel area PA can be disposed to have three second pixel circuits 122 to respectively connect the three light-emitting elements 11 in the pixel area PA.

In the first area AA1, since the length of the first pixel circuit 121 in the first direction X is less than the length of the second pixel circuit 122 in the first direction X, the number of first pixel circuits 121 in each pixel area P1 is greater than 3. Therefore, for a pixel area PA located in the first area AA1, the three first pixel circuits 121 therein are used to respectively connect the three light-emitting elements 11 in the pixel area PA, and the other first pixel circuits 121 are used to correspondingly connect the light-emitting elements 11 in the third area AA3.

For the pixel area PA located in the first area AA1, f first pixel circuits 121 can be disposed, where f is a positive integer greater than 3. f can be any positive integer greater than 3, and the value of f can be set according to requirements. In order to facilitate the layout design in the first area AA1, f can be set to an integer multiple of 3. If f=6, six first pixel circuits 121 can be disposed in the first area AA1, which is equivalent to compressing the length of the normal pixel circuit 122 in the first direction X by half, so as to form six first pixel circuits 121 in one pixel area PA, thereby increasing the number of pixel circuits 12 in the first area AA1.

Figure 8:
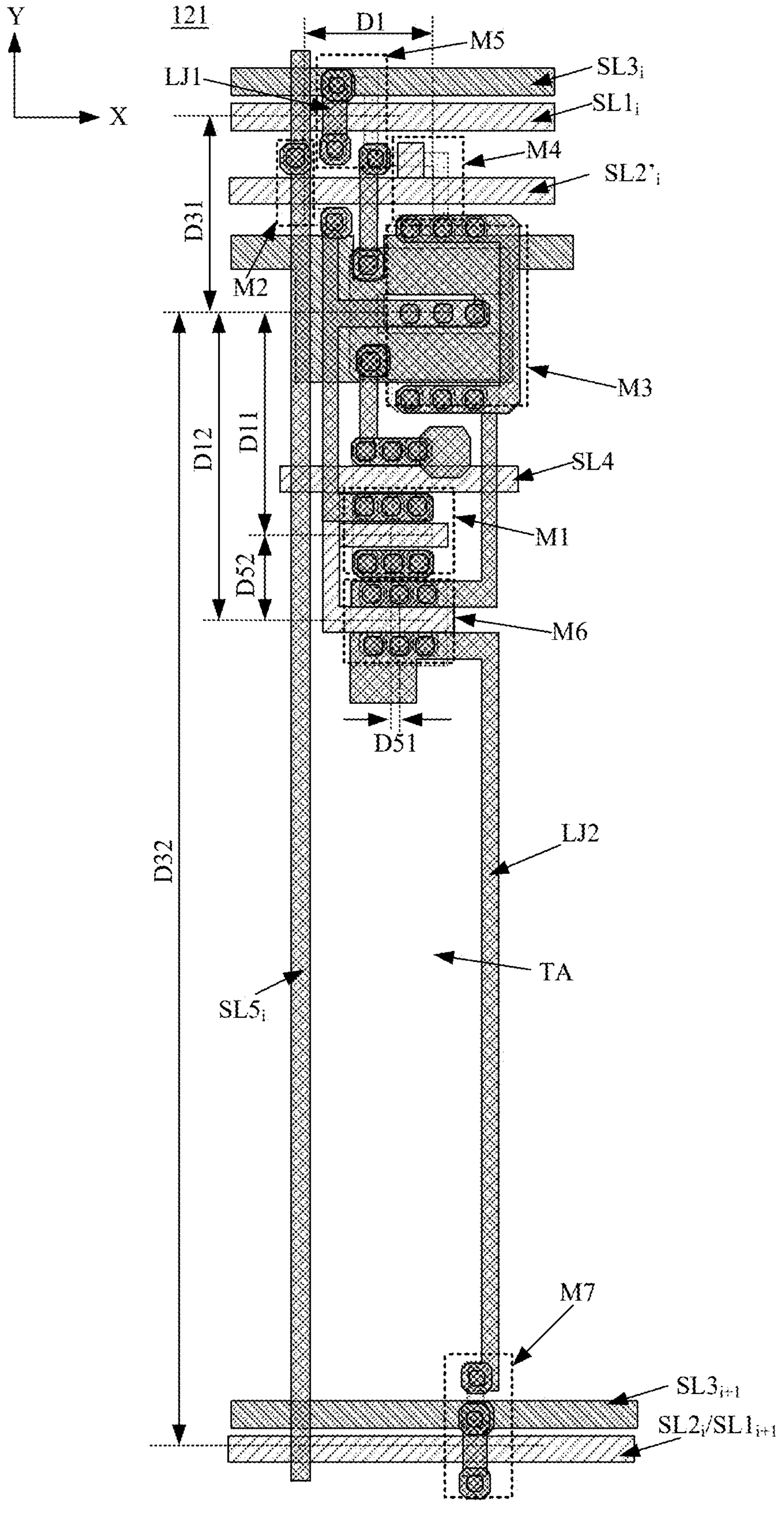
FIG. 8 is a layout of a first pixel circuit provided in an embodiment of the present application.
Figure 9:
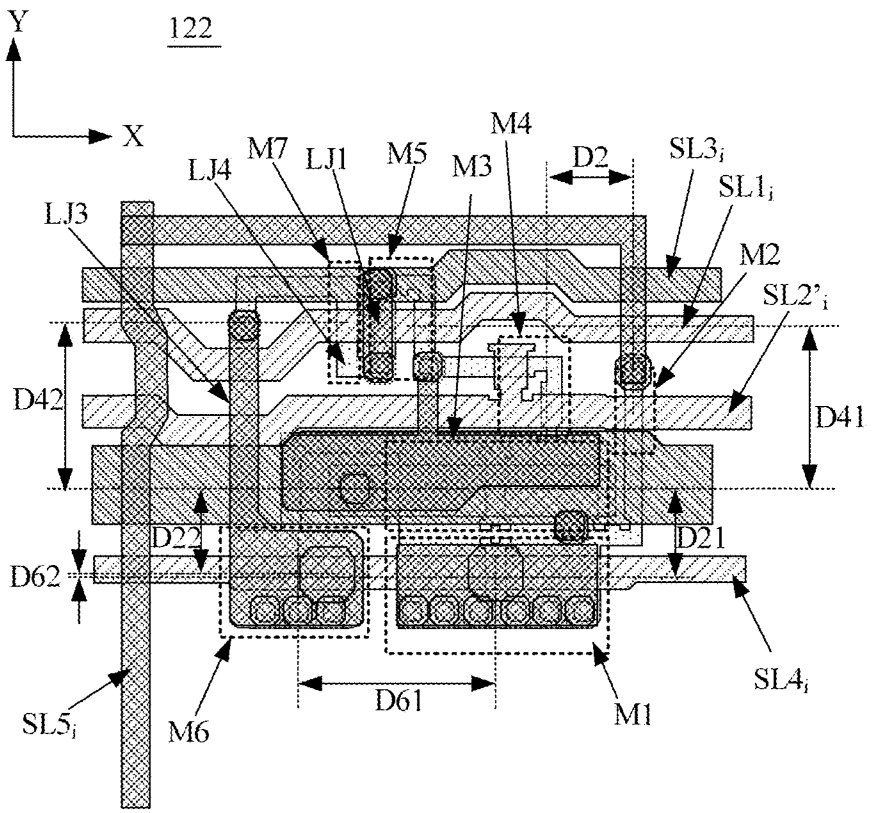
FIG. 9 is a layout of a second pixel circuit provided in an embodiment of the present application.

Referring to FIGS. 8 and 9, FIG. 8 is a layout of a first pixel circuit provided in an embodiment of the present application, and FIG. 9 is a layout of a second pixel circuit provided in an embodiment of the present application. Combined with FIGS. 3A, 3B and 8, the pixel circuit 12 include a first light-emitting control transistor M1 and a second light-emitting control transistor M6, the first electrode of the driving transistor M3 is connected to the first power supply terminal through the first light-emitting control transistor M1, that is, connected to the first power supply voltage PVDD through the first power supply terminal, and the second electrode of the driving transistor M3 is connected to the light-emitting element 11 through the second light-emitting control transistor M6.

As shown in FIG. 8, in the first pixel circuit 121, a distance between the first light-emitting control transistor M1 and the driving transistor M3 in the second direction Y is D11, and a distance between the second light-emitting control transistor M6 and the driving transistor M3 in the second direction Y is D12; as shown in FIG. 9, in the second pixel circuit 122, a distance between the first light-emitting control transistor M1 and the driving transistor M3 in the second direction Y is D21, and a distance between the second light-emitting control transistor M6 and the driving transistor M3 in the second direction Y is D22; where |D11−D12|>|D21−D22|.

It should be noted that in the embodiments of the present application, when marking the distance between two transistors in the second direction Y in the drawings, the distance between the two transistors in the second direction Y is marked with the distance between the center lines of the active regions of the transistors in the second direction Y.

In the embodiments of the present application, the length of the pixel circuit 12 in the first direction X can be adjusted by adjusting the distances of the two light-emitting control transistors in the pixel circuit 12 with respect to the driving transistor M3. As described above, |D11−D12|>|D21−D22| can be set, so that the length of the first pixel circuit 121 in the first direction X can be shortened by increasing |D11−D12|, and L11<L12, and more first pixel circuits 121 can be arranged in the first area AA1.

By setting the first light-emitting control transistor M1 and the second light-emitting control transistor M6 in the first pixel circuit 121 and the second pixel circuit 122 in different arrangements or positions, the lengths of the first pixel circuit 121 and the second pixel circuit 122 in the first direction X or the second direction Y can be adjusted. As shown in FIG. 8, in the first pixel circuit 121, the first light-emitting control transistor M1 and the second light-emitting control transistor M6 are arranged in the second direction, and in the second direction Y, the second light-emitting control transistor M6 is located on one side of the first light-emitting control transistor M1 facing away from the driving transistor M3, and at this time, D12>D11. As shown in FIG. 9, in the second pixel circuit 122, the first light-emitting control transistor M1 and the second light-emitting control transistor M6 are arranged in the first direction. In the second direction, the distance D21 between the first light-emitting control transistor M1 and the driving transistor M3 is equal to the distance D22 between the second light-emitting control transistor M6 and the driving transistor M3 in the second direction, that is, D21=D22.

In the first pixel circuit 121, as shown in FIG. 8, the distance between the first light-emitting control transistor M1 and the second light-emitting control transistor M6 in the first direction X is D51, and the distance between the first light-emitting control transistor M1 and the second light-emitting control transistor M6 in the second direction Y is D52. In the second pixel circuit 122, as shown in FIG. 9, the distance between the first light-emitting control transistor M1 and the second light-emitting control transistor M6 in the first direction X is D61, and the distance in the second direction Y between the first light-emitting control transistor M1 and the second light-emitting control transistor M6 is D62, where D51<D61, and/or, D52>D62.

It should be noted that in the embodiments of the present application, when marking the distance in the first direction X between two transistors in the drawings, the distance in the first direction X between the two transistors is marked with the distance in the first direction X between the center lines of the active regions of the transistors.

Optionally, in the first pixel circuit 121, as shown in FIG. 8, the first light-emitting control transistor M1 and the second light-emitting control transistor M6 can be arranged opposite to each other in the second direction Y, so that the center lines of the active regions of the two in the first direction X coincide or approximately coincide, and D51=0, so as to minimize the length of the first pixel circuit 121 in the first direction X to the maximum extent. In other ways, D51>0 can also be set.

In the first pixel circuit 121, under the premise of avoiding the short circuit between the first light-emitting control transistor M1 and the second light-emitting control transistor M6, D52 can be reduced as much as possible within the range allowed by the process conditions to reduce the length of the first pixel circuit 121 in the second direction Y. When used for a transparent display panel, the area of the transparent area in the first area AA1 can be increased.

Since the size of the pixel circuit 12 in the first direction X does not need to be compressed in the second area AA2, there is enough space in the second area AA2 to arrange the second pixel circuits 122, and since the gates of the first light-emitting control transistor M1 and the second light-emitting control transistor M6 in the second pixel circuit 122 are both input with the light-emitting control signal EMIT, the first light-emitting control transistor M1 and the second light-emitting control transistor M6 in the second pixel circuit 122 can be arranged adjacent to each other in the first direction X.

In the second pixel circuit 122, as shown in FIG. 9, if the first light-emitting control transistor M1 and the second light-emitting control transistor M6 are arranged adjacent to each other in the first direction X, the center lines of the active regions of the first light-emitting control transistor M1 and the second light-emitting control transistor M6 in the first direction X do inevitably not coincide, so D61>0.

In the second pixel circuit 122, as shown in FIG. 9, if the first light-emitting control transistor M1 and the second light-emitting control transistor M6 are arranged adjacent to each other in the first direction X, the first light-emitting control transistor M1 and the second light-emitting control transistor M6 can be connected to the same signal line connected with the light-emitting control signal EMIT, thereby reducing the number of signal lines. At the same time, the first light-emitting control transistor M1 and the second light-emitting control transistor M6 can also be arranged opposite to each other in the first direction X, so that the center lines of the active regions of the first light-emitting control transistor M1 and the second light-emitting control transistor M6 in the second direction Y coincide or approximately coincide, and D62=0 can be set to reduce the size of the second pixel circuit 122 in the second direction Y. When used in a transparent display panel, setting D62=0 can reduce the size of the second pixel circuit 122 in the second direction Y, and can increase the area of the transparent area in the second area AA2.

In the embodiments of the present application, boundaries at two opposite sides of the pixel circuit 12 in the first direction X are the boundaries of the outermost transistors in the pixel circuit 12 in the first direction X, and the boundaries at two opposite sides of the pixel circuit 12 in the second direction Y can be the boundaries of the outermost transistors of the pixel circuit 12 in the second direction Y.

For the first pixel circuit 121, taking the layout shown in FIG. 8 as an example, the left boundary of the first pixel circuit 121 is the left boundary of the data writing transistor M2 accessing the data signal DATA; the right boundary of the first pixel circuit 121 is the right boundary of the driving transistor M3; the upper boundary of the first pixel circuit 121 is the upper boundary of the first reset transistor M5; the lower boundary is the lower boundary of the second reset transistor M7. In the first pixel circuit 121, the second reset transistor M7 is located at the bottom, and the second reset transistor M7 is adjacent to the reset signal line of another first pixel circuit 121 adjacent to the second direction Y. A larger distance can be reserved between the second reset transistor M7 and the second light-emitting control transistor M6 in the same first pixel circuit 121 in the second direction Y to form a transparent area, which can be used for transparent display.

For the second pixel circuit 122, taking the layout shown in FIG. 9 as an example, the left boundary of the second pixel circuit 122 is the left boundary of the second light-emitting control transistor M6; the right boundary of the second pixel circuit 122 is the right boundary of the data writing transistor M2; the upper boundary of the second pixel circuit 122 is the upper boundary of the first reset transistor M5 and/or the second reset transistor M7; the lower boundary of the second pixel circuit 122 is the lower boundary of the first light-emitting control transistor M1 or and/or the second light-emitting control transistor M6.

In one implementation of the embodiments of the present application, D11<D12 can be set as shown in FIG. 8, and/or D21=D22 can be set as shown in the figure.

In the first pixel circuit 121, since D11<D12, the two light-emitting control transistors can be disposed on the same side of the driving transistor M3, and the first light-emitting control transistor M1 and the second light-emitting control transistor M6 are arranged in sequence in the second direction Y, which can reduce the length of the first pixel circuit 121 in the first direction X. In the same first pixel circuit 121, as shown in FIG. 8, the driving transistor M3, the first light-emitting control transistor M1 and the second light-emitting control transistor M6 can be arranged in sequence in the second direction Y, so that the distance in the second direction Y between two adjacent transistors can be more conveniently adjusted, so as to shorten the length of the first pixel circuit 121 in the first direction X.

In the second pixel circuit 122, since D21=D22, the two light-emitting control transistors can be arranged on the same side of the driving transistor, so that the center lines of the active regions of the two in the second direction Y coincide or approximately coincide, so that the first light-emitting control transistor M1 and the second light-emitting control transistor M6 can be arranged opposite to each other in the first direction X, the gates are connected to the same scanning signal line, and the length of the second pixel circuit 122 in the second direction Y can be reduced. In the same second pixel circuit 122, as shown in FIG. 9, the first light-emitting control transistor M1 and the second light-emitting control transistor M6 can be arranged on the same side of the driving transistor M3 in the second direction Y, and the first light-emitting control transistor M1 and the second light-emitting control transistor M6 are arranged adjacent to each other in the first direction X, and the gates of the two can be connected to the same light-emitting control signal line to be input with the light-emitting control signal at the same time, which can reduce the number of scanning signal lines.

As mentioned above, the pixel circuits include a first reset transistor M5. As shown in FIG. 8 or FIG. 9, the gate of the first reset transistor M5 can be connected to the first scanning signal line SL1, the first scanning signal S1 can be connected to the gate of the first reset transistor M5 through the first scanning signal line SL1, the first electrode of the first reset transistor M5 is connected to the reset signal line SL3, the reset signal VREF can be connected to the first electrode of the first reset transistor M5 through the reset signal line SL3, and the second electrode of the first reset transistor M5 is connected to the gate of the driving transistor M3. The reset signal line SL3 is located on one side of the first scanning signal line SL1 facing away from the driving transistor M3, so that part of the active region of the first reset transistor M5 and the reset signal line SL3 can have an overlapping part in a direction perpendicular to the plane where the display panel is located, thereby shortening the length of the pixel circuit 12 in the second direction Y.

FIG. 8 not only shows the first scanning signal line $SL1_i$ and the reset signal line $SL3_i$ connected to the i-th first pixel circuit 121 in the second direction Y, but also shows the first scanning signal line $SL1_{i+1}$ and the reset signal line $SL3_{i+1}$ connected to the next first pixel circuit 121. FIG. 9 shows the first scanning signal line $SL1_i$ and the reset signal line $SL3_i$ connected to the i-th first pixel circuit 121 in the second direction Y. i is a positive integer.

Figure 10:
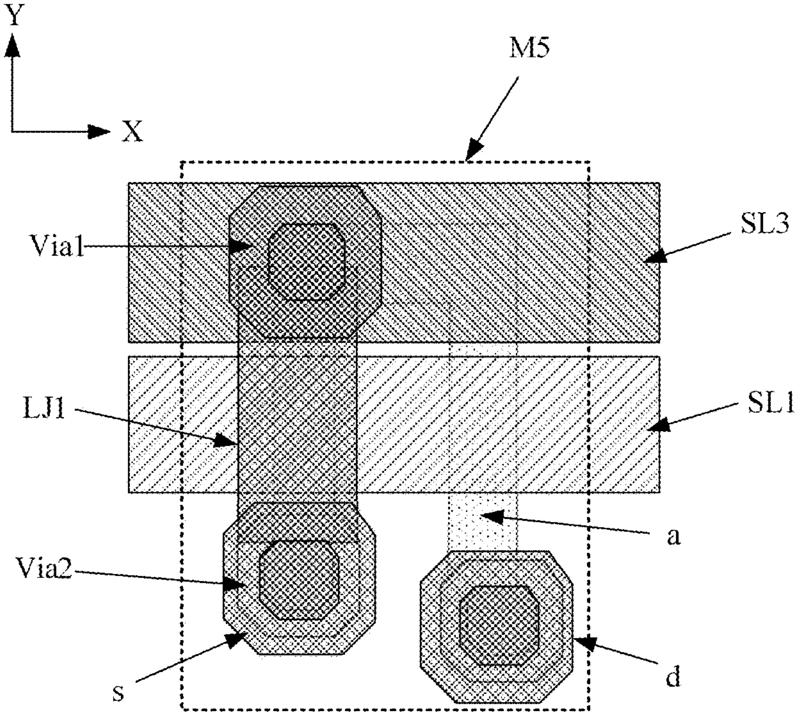
FIG. 10 is a partial enlarged view of a pixel circuit layout provided in an embodiment of the present application.

Referring to FIG. 10, FIG. 10 is a partial enlarged view of a pixel circuit layout provided in an embodiment of the present application, and FIG. 10 is a partial enlarged view of the layout of the pixel circuit 12 in the area corresponding to the first reset transistor M5. The first electrode s and the reset signal line SL3 of the first reset transistor M5 are both connected to the first connection portion LJ1; the first connection portion LJ1 and the first scanning signal line SL1 partially overlap.

The overlapping portion of the first scanning signal line SL1 and the active region a of the first reset transistor M5 in the third direction is also used as the gate of the first reset transistor M5. The third direction is perpendicular to the first direction X and the second direction Y, that is, the third direction is perpendicular to the plane where the display panel is located.

Optionally, the first reset transistor M5 is a dual-gate transistor with two TFTs. At this time, the first scanning signal line SL1 and the active region a of the first reset transistor M5 have two cross-overlapping areas, each serving as the gate of one TFT.

As shown in FIG. 8-FIG. 10, in the embodiments of the present application, the first electrode s of the first reset transistor M5 can be connected to the reset signal line SL3 through the first connection portion LJ1, and the reset signal provided by the reset signal line SL3 is provided to the first electrode s of the first reset transistor M5 through the first connection portion LJ1. The first connection portion LJ1 and the first scanning signal line SL1 partially overlap, thereby compressing the length of the pixel circuit in the second direction Y. The second electrode d of the first reset transistor M5 is connected to the gate of the driving transistor M3, thereby realizing circuit interconnection.

The first connection portion LJ1 can be prepared by other metal layers that are not in the same layer as the first scanning signal line SL1, so that the first connection portion LJ1 can be insulated and crossed with the first scanning signal line SL1.

As mentioned above, the pixel circuit 12 includes a data writing transistor M2 and a threshold compensation transistor M4, and the first electrode of the data writing transistor M2 is connected to the first electrode of the driving transistor M3. As shown in FIGS. 8 and 9, the second electrode of the data writing transistor M2 is connected to the data line SL5, so as to access the data signal DATA for the data writing transistor M2 through the data line SL5; the first electrode of the threshold compensation transistor M4 is connected to the gate of the driving transistor M3, and the second electrode of the threshold compensation transistor M4 is connected to the second electrode of the driving transistor M3. In the layout of the second pixel circuit 122 shown in FIG. 9, the data signal line SL5 connected to the data writing transistor M2 in the second pixel circuit 122 is disposed on one side of the data writing transistor M2 facing away from the driving transistor M3, that is, the data signal line SL5 is disposed on the right side of FIG. 9, or on one side of the driving transistor facing away from the data writing transistor M2. In other ways, the data signal line SL5 can also be disposed on the left side of FIG. 9. FIGS. 8 and 9 show the data line SL5; connected to the i-th pixel circuit 12 in the second direction Y.

In the first pixel circuit 121, as shown in FIG. 8, the distance in the first direction X between the data writing transistor M2 and the threshold compensation transistor M4 is D1; in the second pixel circuit 122, as shown in FIG. 9, the distance in the first direction X between the data writing transistor M2 and the threshold compensation transistor M4 is D2.

In one implementation of the embodiments of the present application, for the second pixel circuit 122, as shown in FIG. 9, the data writing transistor M2 and the threshold compensation transistor M4 can be disposed on the same side of the driving transistor M3, and disposed adjacent to each other in the first direction X. In this way, the data writing transistor M2 and the threshold compensation transistor M4 can be disposed between the first scanning signal line SL1 and the driving transistor M3. At this time, D1>D2 or D1=D2 can be set.

Figure 11:
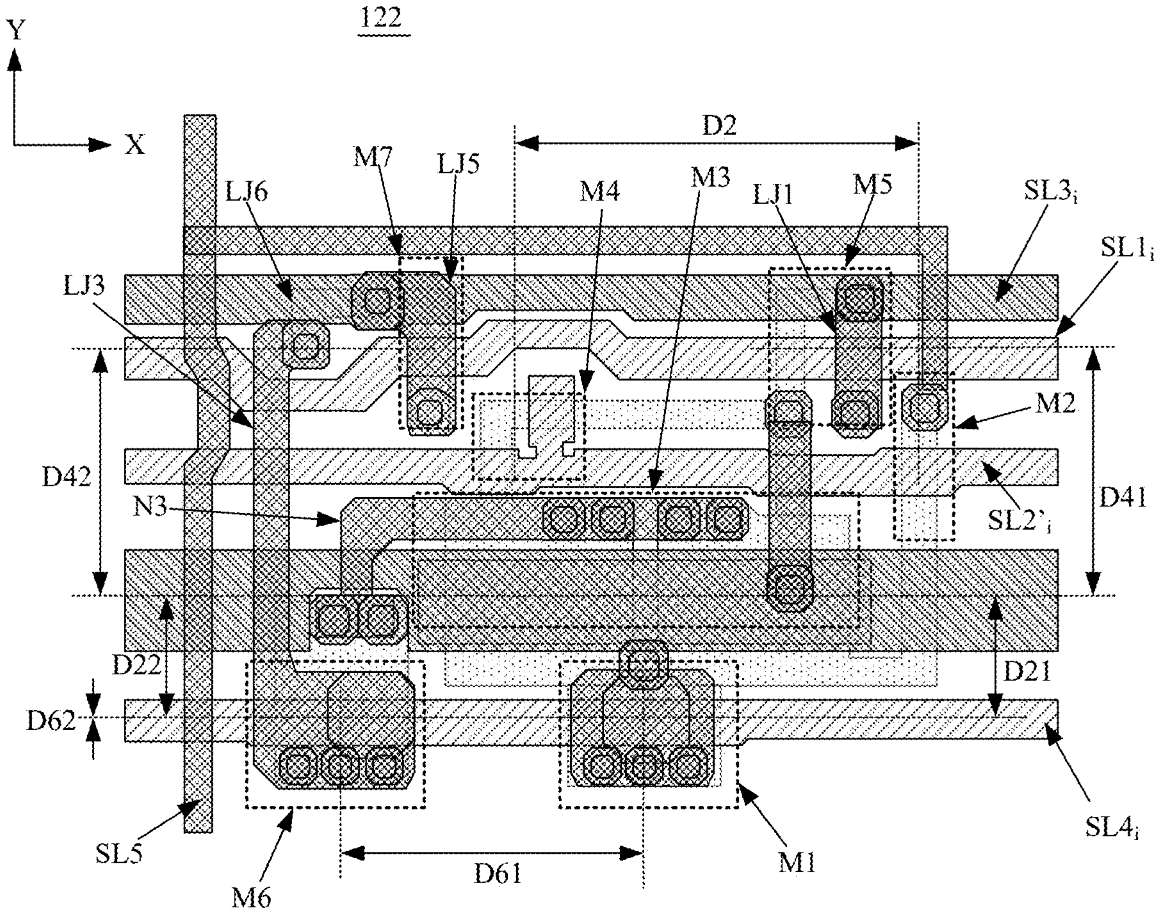
FIG. 11 is a layout of another second pixel circuit provided in an embodiment of the present application.

Referring to FIG. 11, FIG. 11 is a layout of another second pixel circuit provided in an embodiment of the present application. Compared with the arrangement shown in FIG. 9, the arrangement shown in FIG. 11 increases the distance D2 in the first direction X between the data writing transistor M2 and the threshold compensation transistor M4 in the second pixel circuit 122, so that D1<D2.

Compared with the arrangement shown in FIG. 9, in the arrangement shown in FIG. 11, D1<D2, the distance in the first direction X between the threshold compensation transistor M4 and the data writing transistor M2 is increased, and the threshold compensation transistor M4 can be closer to the second light-emitting control transistor M6. At this time, in combination with FIG. 3A, FIG. 3B and FIG. 11, the second electrode of the threshold compensation transistor M4 is electrically connected to the first electrode of the second light-emitting control transistor M6 at the third node N3. At this time, the third node N3 of the second pixel circuit 122 can be transferred from the polysilicon layer where the active region is located to the metal layer where the transistor source and drain are located, so as to reduce the impedance of the pixel circuit 12 at the third node N3, thereby reducing the voltage drop.

As described above, the pixel circuit 12 also includes a first reset transistor M5 and a second reset transistor M7, the first reset transistor M5 is connected to the gate of the driving transistor M3 for providing a first reset signal to the gate of the driving transistor M3, and the second reset transistor M7 is connected to the first electrode of the light-emitting element 11 for providing a second reset signal to the first electrode of the light-emitting element 11.

Optionally, the first reset signal and the second reset signal can be the same, both can be reset signals VREF. In other ways, the first reset signal and the second reset signal may also be different reset signals.

In the first pixel circuit 121, the first reset transistor M5 and the second reset transistor M7 are connected to different reset signal lines respectively, so that the first reset transistor M5 and the second reset transistor M7 can be disposed to be distributed along the second direction Y, thereby reducing the length of the first pixel circuit 121 in the first direction X.

In particular, since the second electrode of the second light-emitting control transistor M6 and the second electrode of the second reset transistor M7 need to be connected through the second connection portion LJ2, the first reset transistor M5 and the second reset transistor M7 are connected to different reset signal lines respectively, so that the second connection portion LJ2 can be extended to the next first pixel circuit 121, thereby avoiding the second connection line LJ2 from occupying the wiring space between the first pixel circuits 121, which is conducive to reducing the distance between the first pixel circuits 121.

In the second pixel circuit 122, as shown in FIG. 9 or FIG. 11, the gate of the first reset transistor M5 is connected to the first scanning signal line SL1, and the gate of the second reset transistor M7 is connected to the first scanning signal line SL1. Since the length of the pixel circuit 12 in the first direction X does not need to be compressed in the second area AA2, there is enough space to arrange the second pixel circuit 122 along the first direction X. Therefore, in the second pixel circuit 122, the first reset transistor M5 and the second reset transistor M7 can be arranged in sequence in the first direction X, so that the two can share the same first scanning signal line SL1.

For the first pixel circuit 121, the second scanning signal line $SL2_i$ connected to the first pixel circuit 121 at the i-th row is also used as the first scanning signal line $SL1_i$ of the first pixel circuit 121 at the i+1-th row, where i is a positive integer. That is to say, for adjacent two of the first pixel circuits 121 in the second direction Y, the second scanning signal line SL2 connected to the second reset transistor M7 in the front first pixel circuit 121 is used as the first scanning signal line connected to the first reset transistor M5 in the next first pixel circuit 121.

FIG. 8 shows the first scanning signal line $SL1_i$ connected to the i-th first pixel circuit 121 and the first scanning signal line $SL1_i$-connected to the i+1-th first pixel circuit 121 in the second direction Y, the gate of the second reset transistor M7 in the i-th first pixel circuit 121 is connected to the first scanning signal line $SL1_{i+1}$, and the first scanning signal line $S1_{Li+1}$ is also used as the second scanning signal line $SL2_i$ connected to the second reset transistor M7 in the i-th first pixel circuit 121. This arrangement is equivalent to reusing the first scanning signal line SL1 in the first pixel circuit 121 at a next row as the second scanning signal line SL2 connected to the second reset transistor M7 in the first pixel circuit 121 at a front row. At this time, the second reset transistor M7 of the first pixel circuit 121 at a front row can also be disposed to be input with the reset signal VREF through the reset signal line LS3 of the first pixel circuit 121 at a next row. This arrangement can not only reduce the length of the first pixel circuit 121 in the first direction X, but also avoid the problem of increasing signal lines due to the two reset transistors being distributed in sequence along the second direction Y.

For the pixel circuits 12 at the same row, a first trace SL2' for providing a second scanning signal S2 is connected. FIG. 8 shows the first trace $SL2'_i$ connected to the pixel circuit 12 at the i-th row. The first trace SL2' is used to provide the second scanning signal S2 for the data writing transistor M2 and the threshold compensation transistor M4 in the pixel circuits 12 at the same row. The first trace SL2' can be located between the first scanning signal line SL1 and the driving transistor M3 in the connected pixel circuit 12.

In the first pixel circuit 121, as shown in FIG. 8, the distance between the first reset transistor M5 and the driving transistor M3 in the second direction Y is D31, and the distance between the second reset transistor M7 and the driving transistor M3 in the second direction is D32. In the second pixel circuit 122, as shown in FIG. 9 or FIG. 11, the distance between the first reset transistor M5 and the driving transistor M3 in the second direction Y is D41, and the distance between the second reset transistor M7 and the driving transistor M3 in the second direction Y is D42; where $|D31-D32|>|D41-D42|$. In this way, in the second direction Y, the distance difference of the two reset transistors with the driving transistor M3 in the first pixel circuit 121 is different from the distance difference of the two reset transistors with the driving transistor M3 in the first pixel circuit 122, and the distance difference corresponding to the first pixel circuit 121 is larger, which can increase the lengths of the two reset transistors in the first pixel circuit 121 in the second direction Y, thereby shortening the distance between the two reset transistors in the first pixel circuit 121 in the first direction X, and shortening the length of the first pixel circuit 121 in the first direction X.

In the second area AA2, since it is not necessary to compress the length of the pixel circuit 12 in the first direction X, the first reset transistor M5 and the second reset transistor M7 can be arranged along the first direction X so that the gates of the two can share the same first scanning signal line SL1, and the first electrodes of the two can share the same reset signal line SL3; the data writing transistor M2 and the threshold compensation transistor M4 can be arranged adjacent to each other in the first direction X so that the gates of the two can share the same second scanning signal line SL2; the first light-emitting control transistor M1 and the second light-emitting control transistor M6 can be arranged adjacent to each other in the first direction X so that the gates of the two can share the same light-emitting control signal line SL4. Thus, the number of signal lines in the second area AA2 can be reduced.

Optionally, in the first pixel circuit 121, D31<D32 can be set as shown in FIG. 8. When used for a transparent display panel, in the first pixel circuit 121, a larger distance D32 between the second reset transistor M7 and the driving transistor M3 in the second direction can be used to form a transparent area TA in the first pixel circuit 121. Specifically, if D31<D32, as shown in FIG. 8, there is a larger distance between the second reset transistor M7 located below the driving transistor M3 and the driving transistor M3, so that a transparent area TA can be formed between the second reset transistor M7 of the first pixel circuit 121 and other parts of the first pixel circuit 121, which can be used to form a transparent display panel.

When used for a transparent display panel, a corresponding transparent area TA can be disposed for each first pixel circuit 121. In the second reset transistor in the same first pixel circuit 121, a transparent area TA can be formed in the first pixel circuit 121 based on the larger distance D32. As shown in FIG. 8, the transparent area TA in the first pixel circuit 121 is located inside the first pixel circuit 121. Specifically, for a transparent area TA of a first pixel circuit 121, the left side of the transparent area TA is the data line SL5 of the first pixel circuit 121, the right side of the transparent area TA is the second connection portion LJ2, the upper end of the transparent area TA is connected to the second light-emitting control transistor M6 in the first pixel circuit 121, and the lower end of the transparent area TA is connected to the reset signal line SL3 of the next first pixel circuit 121 adjacent in the second direction. The second connection portion LJ2 is the signal line connected to the second electrode of the second reset transistor M7 in the first pixel circuit 121.

As shown in FIG. 8, for adjacent of the two first pixel circuits 121 in the second direction Y, the second reset transistor M7 of the front first pixel circuit 121 is disposed to extend downward to the circuit area of the next first pixel circuit 121 based on the second connection portion LJ2. Compared with the scheme in which the second reset transistor M7 extends upward to the upper end of the first pixel circuit 121 based on the second connection portion LJ2, the second connection portion LJ2 can be prevented from increasing the length of the circuit area in the first direction X.

Optionally, in the second pixel circuit 122, D41=D42 can be set as shown in FIG. 9 or FIG. 11. At this time, the two reset transistors in the second pixel circuit 122 can be directly opposite to each other along the first direction, thereby reducing the length of the second pixel circuit 122 in the second direction Y. Since there is enough arrangement space in the second area AA2 to arrange the second pixel circuits 122, there is no need to compress the length of the second pixel circuit 122 in the first direction X, and the arrangement space in the first direction X can be fully utilized to arrange the two reset transistors in the second pixel circuit 122. When used in a transparent display panel, the length of the second pixel circuit 122 is reduced in the second direction Y, so that the second pixel circuit 122 has a relatively large area of the transparent area.

In the first pixel circuit 121, the distance between the second reset transistor M7 and the driving transistor M3 in the second direction Y is D32; in the second pixel circuit 122, the distance between the second reset transistor M7 and the driving transistor M3 in the second direction is D42; where D32>D42. In this way, the second connection portion LJ2 connecting the second electrode of the second light-emitting control transistor M6 and the second electrode of the second reset transistor M7 in the first pixel circuit 121 can be extended to the next first pixel circuit 121, thereby avoiding the second connection line LJ2 from occupying the wiring space between the first pixel circuits 121, which is conducive to reducing the distance between the first pixel circuits 121, so that the first area AA1 can be provided with more first pixel circuits 121 in the same row.

Moreover, in the embodiments of the present application, setting D32>D42 can make the first pixel circuit 121 have a relatively large distance between the second reset transistor M7 and the driving transistor M3, so that the transparent area TA can be laid out based on the distance to facilitate transparent display. In addition, by increasing D32, the length of the first pixel circuit 121 in the second direction Y can be increased to reduce the length of the first pixel circuit 121 in the first direction X.

As mentioned above, the pixel circuit 12 also includes a second light-emitting control transistor M6, and the second electrode of the driving transistor M3 is connected to the light-emitting element 11 through the second light-emitting control transistor M6; as shown in FIG. 8, in the first pixel circuit 121, the second electrode of the second reset transistor M7 is connected to the second electrode of the second light-emitting control transistor M6 through the second connection portion LJ2; as shown in FIG. 9 or FIG. 11, in the second pixel circuit 122, the second electrode of the second reset transistor M7 is connected to the second electrode of the second light-emitting control transistor M6 through the third connection portion LJ3; the length of the second connection portion LJ2 in the second direction Y is greater than the length of the third connection portion LJ3 in the second direction Y.

The length of the second connection portion LJ2 in the second direction Y is set to be greater than the length of the third connection portion LJ3 in the second direction Y. Along the second direction Y, the distance between the second light-emitting control transistor M6 and the second reset transistor M7 in the first pixel circuit 121 is larger, and the distance between the second light-emitting control transistor M6 and the second reset transistor M7 in the second pixel circuit 122 is smaller. The length of the first pixel circuit 121 in the second direction Y can be increased to reduce the length of the first pixel circuit 121 in the first direction X. At the same time, the first pixel circuit 121 can also define the two opposite sides of the corresponding transparent area TA in the first direction X based on the connected data line SL5 and the second connection portion LJ2. In the second pixel circuit 122, all transistors are located on the same side of the corresponding transparent area TA. In addition, the second connection portion LJ2 in the first pixel circuit 121 extends to the next first pixel circuit 121, which can avoid the second connection line LJ2 occupying the wiring space between the first pixel circuits 121, which is conducive to reducing the distance between the first pixel circuits 121, so that the first area AA1 is provided with more first pixel circuits 121 in the same row.

Each pixel circuit 12 has a correspondingly disposed transparent area. The transparent area TA corresponding to the first pixel circuit 121 is located inside the first pixel circuit 121. Therefore, in the first area AA1, the transparent areas of the respective first pixel circuits 121 are isolated from each other based on the transistors and wirings in the first pixel circuits 121.

There are multiple pixel units arranged in sequence along the first direction X. The pixel unit includes multiple light-emitting elements 11 arranged in sequence along the first direction X. The pixel unit can be disposed to include three light-emitting elements 11 with different light-emission colors, which are used to emit red light, green light and blue light respectively. For the same pixel unit, the transparent area TA corresponding to the connected second pixel circuit 122 is an integrated transparent area, and the integrated transparent areas corresponding to different pixel units are isolated based on the data line, and isolated based on the non-transparent area where the second pixel circuit 12 is located.

In one implementation of the embodiments of the present application, as shown in FIG. 9, in the second pixel circuit 122, the first electrode of the first reset transistor M5 can be disposed to be connected to the first electrode of the second reset transistor M7 through the fourth connection portion SL4; the fourth connection portion SL4 is connected to the reset signal line SL3 through the first connection portion SL1. In this arrangement, the second reset transistor M7 is first connected to the first electrode of the first reset transistor M5 through the fourth connection portion LJ4, and then the two reset transistors are simultaneously connected to the reset signal line SL3 through the first connection portion LJ1. There is no need to connect the two reset transistors M5 each to the reset signal line SL3, which can simplify the wiring method. In this arrangement, the first reset transistor M5 and the second reset transistor M7 are arranged adjacent to each other in the first direction X. When the first reset transistor M5 is connected to the reset signal line SL3 through the fourth connection portion LJ3 and the first connection portion LJ1 in sequence, the second reset transistor M7 can reuse the via connected to the first reset transistor M5 to connect with the same reset signal line SL3. Specifically, as shown in FIGS. 9 and 10, the second reset transistor M7 can share the via Via1 connected to the upper end of the first connection portion LJ1 and the via Via2 connected to the lower end.

The active region of the transistor can be prepared by a polysilicon layer, the gate of the transistor can be prepared by a first metal layer located above the polysilicon layer, and the source and drain can be prepared by a second metal layer located above the first metal layer.

Optionally, the fourth connection portion LJ4 can be prepared by a polysilicon layer. The first connection portion LJ1 can be prepared by a second metal layer.

In another embodiment, for the second pixel circuit 122, as shown in FIG. 11, two reset transistors can be arranged on both sides of the driving transistor M3 in the first direction X respectively, so that there is a relatively large arrangement space between the driving transistor M3 and the first scanning signal line SL1, so as to facilitate the arrangement of the threshold compensation transistor M4, and the third node N3 of the second pixel circuit 122 can be transferred from the polysilicon layer where the active region is located to the metal layer where the transistor source and drain are located, so as to reduce the impedance of the pixel circuit 12 at the third node N3, thereby reducing the voltage drop.

In an arrangement shown in FIG. 11, the first electrode of the second reset transistor M7 needs to be connected to the reset signal line SL3 through the fifth connection portion LJ5, and the second electrode of the second reset transistor M7 is connected to the second electrode of the second light-emitting control transistor M6 through the sixth connection portion LJ6.

Optionally, the fifth connection portion LJ5 can be prepared by the second metal layer, and the sixth connection portion LJ6 can be prepared by the polysilicon layer.

In the embodiments of the present application, the light-emitting element 11 may be a micro LED, such as Mini LED, or Micro LED, or Nano LED, and the embodiments of the present application does not limit the type of the light-emitting element 11.

In one implementation of the embodiments of the present application, the light-emitting element 11 includes a first light-emitting element and a second light-emitting element with different light-emission colors; the wavelength of the light emitted by the first light-emitting element is greater than the wavelength of the light emitted by the second light-emitting element. Optionally, the first light-emitting element may be a light-emitting element 11 that emits red light, and the second light-emitting element may be a light-emitting element 11 that emits green light or blue light.

In general, the light-emitting efficiency of the light-emitting element 11 is negatively correlated with its emission wavelength, and the longer the emission wavelength, the lower the light-emitting efficiency. Therefore, the light-emitting efficiency of the first light-emitting element is less than that of the second light-emitting element. For example, the light-emitting efficiency of the light-emitting element 11 that emits red light is less than the light-emitting efficiency of the light-emitting element 11 that emits green light or blue light. The first light-emitting element is a red light-emitting element, and the second light-emitting element is a green light-emitting element or blue light-emitting element.

Figure 12:
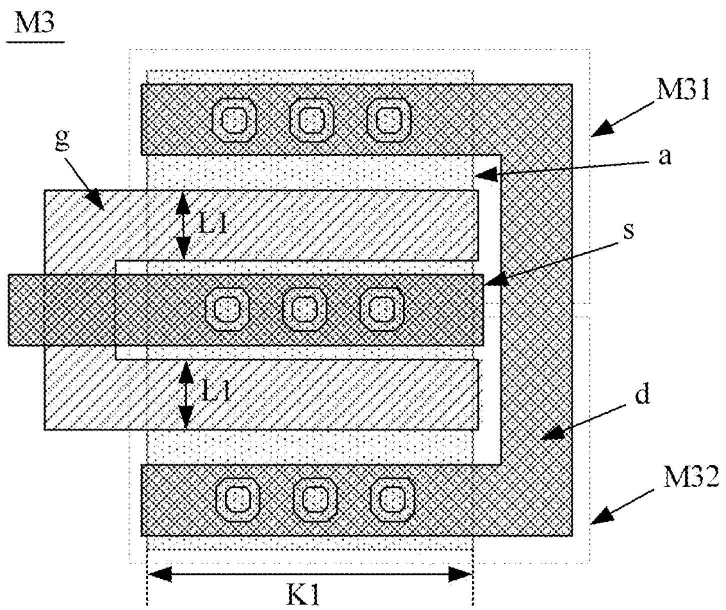
FIG. 12 is a layout of a driving transistor in a pixel circuit connected to a first light-emitting element.
Figure 13:
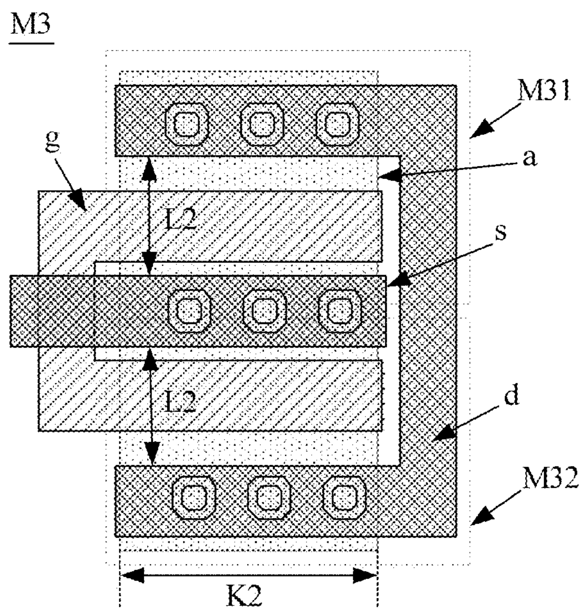
FIG. 13 is a layout of a driving transistor in a pixel circuit connected to a second light-emitting element.

Referring to FIGS. 12 and 13, FIG. 12 is a layout of a driving transistor in a pixel circuit connected to a first light-emitting element, and FIG. 13 is a layout of a driving transistor in a pixel circuit connected to a second light-emitting element. As described above, the pixel circuit 12 includes a driving transistor M3; wherein the channel width-to-length ratio of the driving transistor M3 in the pixel circuit 12 corresponding to the first light-emitting element is A1; and the channel width-to-length ratio of the driving transistor M3 in the pixel circuit 12 corresponding to the second light-emitting element is A2, where A1>A2.

The light-emitting efficiency of a light-emitting element varies with the magnitude of the driving current, and the sizes of the driving circuits required for light-emitting elements with different colors at the highest light-emitting efficiencies are different. In some embodiments, the driving circuit provided by the pixel circuit 12 to the red light-emitting element is $I_1$, and the light-emitting efficiency of the red light-emitting element is the highest light-emitting efficiency; the driving circuit provided by the pixel circuit 12 to the blue light-emitting element is $I_2$, and the light-emitting efficiency of the blue light-emitting element is the highest light-emitting efficiency; the driving circuit provided by the pixel circuit 12 to the green light-emitting element is $I_3$, and the light-emitting efficiency of the green light-emitting element is the highest light-emitting efficiency, where $I_1>I_2$, and/or $I_1>I_3$. The display panel driving using red light-emitting elements, blue light-emitting elements and green light-emitting elements may use a relatively large current drive. That is, when the light-emitting efficiencies of the red light-emitting element, the blue light-emitting element and the green light-emitting element are close to their maximum light-emitting efficiencies at the same time, the driving current required by the red light-emitting element is greater than the driving current required by the blue light-emitting element or the green light-emitting element. The magnitude of the driving current is related to the width-to-length ratio of the driving transistor. The width-to-length ratio of the driving transistor M3 in the pixel circuit 12 is large, and the driving current provided by the pixel circuit 12 is large.

As mentioned above, the light-emitting efficiencies of the light-emitting elements 11 with different light-emission colors are different. Since the first light-emitting element and the second light-emitting element have different light-emitting wavelengths, the first light-emitting element and the second light-emitting element correspond to different light-emission colors and have different light-emitting efficiencies. If the same driving capability (such as driving current) is used, the light-emitting efficiencies of the red light-emitting element, the blue light-emitting element, and the green light-emitting element cannot approach the highest light-emitting efficiency of the squeak at the same time, and cannot reach their respective maximum light-emitting brightness, resulting in the light-emitting brightness of the entire display panel being limited. In order to solve this problem, in the embodiments of the present application, A1>A2 is set. In this way, the driving transistor M3 in the pixel circuit 12 connected to the first light-emitting element (such as the red light-emitting element) can have a relatively large channel width-to-length ratio, which can improve the driving capability of the driving transistor M3 and solve the image display quality problem caused by the different light-emitting efficiencies of the first light-emitting element and the second light-emitting element.

For the driving transistor M3 having multiple parallel sub-transistors, the extension direction of the gate g of each sub-transistor is the width direction of the channel, and the length of the overlapping part of the gate g and the active region a in this direction is the channel width K; the distance between the first electrode s and the second electrode d is the channel length L. Generally, the channel width K of each sub-transistor is set to be the same, and the channel length L of each sub-transistor is the same. The channel width length of the driving transistor M3 is equal to the ratio of the sum of the channel widths of all sub-transistors to L.

As shown in FIG. 12, for the pixel circuit 12 connected to the first light-emitting element, the channel widths of the first sub-transistor M31 and the second sub-transistor M32 in the driving transistor M3 are set to be K1, and the channel lengths of the first sub-transistor M31 and the second sub-transistor M32 are set to be L1, then the channel width-to-length ratio of the driving transistor M3 is A1=2·K1/L1.

As shown in FIG. 13, for the pixel circuit 12 connected to the second light-emitting element, the channel widths of the first sub-transistor M31 and the second sub-transistor M32 in the driving transistor M3 are set to be K2, and the channel lengths of the first sub-transistor M31 and the second sub-transistor M32 are set to be L2, then the channel width-to-length ratio of the driving transistor M3 is A2=2·K2/L2.

In the first pixel circuit 121, since the driving transistor M3 is a multi-sub-transistor parallel structure, the lengths of other transistors in the first direction X are smaller than those of the driving transistor M3. Therefore, when used in a transparent display panel, in the first pixel circuit 121, if the channel width K of other transistors other than the driving transistor M3 is greater than the channel length L, the channel width K is set to be the size along the first direction X. On the contrary, if the channel width K is less than the channel length L, the channel width is set along the second direction Y to reduce the length of the transistor in the second direction Y, so as to increase the area of the transparent area TA in the first pixel circuit 121 and improve the light transmission performance.

In one implementation of the embodiments of the present application, the channel width-to-length ratio of the driving transistor M3 in the first pixel circuit 121 corresponding to the first light-emitting element can be set to be equal to the channel width-to-length ratio of the driving transistor M3 in the second pixel circuit 122 corresponding to the first light-emitting element; at this time, whether the first light-emitting element is in the first area AA1 or in the second area AA2, the driving transistor M3 in the pixel circuit 12 connected to the first light-emitting element has the same channel width-to-length ratio.

In one embodiment of the embodiments of the present application, the channel width-to-length ratio of the driving transistor in the first pixel circuit 121 corresponding to the second light-emitting element can be set to be equal to the channel width-to-length ratio of the driving transistor M3 in the second pixel circuit 122 corresponding to the second light-emitting element. At this time, no matter the first light-emitting element is in the first area AA1 or in the second area AA2, the driving transistor M3 in the pixel circuit 12 connected to the second light-emitting element has the same channel width-to-length ratio.

In one implementation of the embodiments of the present application, the channel width-to-length ratio of the driving transistor M3 in the first pixel circuit 121 corresponding to the first light-emitting element can be set to be equal to the channel width-to-length ratio of the driving transistor M3 in the second pixel circuit 122 corresponding to the first light-emitting element, and the channel width-to-length ratio of the driving transistor in the first pixel circuit 121 corresponding to the second light-emitting element is equal to the channel width-to-length ratio of the driving transistor M3 in the second pixel circuit 122 corresponding to the second light-emitting element. In this way, in the pixel circuit 12 connected to the light-emitting elements 11 of the same light-emission color, the first pixel circuit 121 and the second pixel circuit 122 have the same channel width-to-length ratio of the driving transistor M3, which facilitates the parameter design and preparation of the driving transistor M3 in the pixel circuit 12 connected to the light-emitting elements 11 with the same light-emission color.

In other arrangements, the channel width-to-length ratios of the thin film transistors with the same function in any two pixel circuits 12 can also be set to be the same, so as to facilitate the process preparation of the pixel circuits in the display panel. For example, if the driving transistor M3 includes two sub-transistors, the two sub-transistors of the driving transistor M3 in the pixel circuit 12 connected to the first light-emitting element are set to be TFT1 and TFT2 respectively, and the two sub-transistors of the driving transistor M3 in the pixel circuit 12 connected to the second light-emitting element are set to be TFT11 and TFT21 respectively, then the channel width-to-length ratio of TFT1 and TFT11 can be set to be the same, and the channel width-to-length ratio of TFT2 and TFT21 can be set to be the same; if the first light-emitting control transistor M1 includes two sub-transistors, the two sub-transistors of the first light-emitting control transistor M1 in the pixel circuit 12 connected to the first light-emitting element are set to be TFT3 and TFT4 respectively, the two sub-transistors of the first light-emitting control transistor M1 in the pixel circuit 12 connected to the second light-emitting element are TFT31 and TFT41 respectively, the channel width-to-length ratio of TFT3 and TFT31 can be set to be the same, and the channel width-to-length ratio of TFT4 and TFT41 can be set to be the same; if the second light-emitting control transistor M6 is a single transistor, the single transistor of the second light-emitting control transistor M6 in the pixel circuit 12 connected to the first light-emitting element is set to be TFT5, and the single transistor of the second light-emitting control transistor M6 in the pixel circuit 12 connected to the second light-emitting element is TFT51, then the channel width-to-length ratio of TFT5 and TFT51 can be set to be the same.

If the channel width-to-length ratios of the thin film transistors with the same function in the two pixel circuits 12 are the same, in the two pixel circuits, the channel width-to-length ratios of the first light-emitting control transistors M1 are the same; the channel width-to-length ratios of the data writing transistors M2 are the same; the channel width-to-length ratios of the driving transistors M3 are the same; the channel width-to-length ratios of the threshold compensation transistors M4 are the same; the channel width-to-length ratios of the first reset transistors M5 are the same; the channel width-to-length ratios of the second light-emitting control transistors M6 are the same; the channel width-to-length ratios of the second reset transistors M7 are the same;

In one implementation of the embodiments of the present application, the channel width-to-length ratio of the driving transistor M3 in the first pixel circuit 121 corresponding to the first light-emitting element can be set to be different from the channel width-to-length ratio of the driving transistor M3 in the second pixel circuit 122 corresponding to the first light-emitting element; and/or, the channel width-to-length ratio of the driving transistor in the first pixel circuit 121 corresponding to the second light-emitting element is different from the channel width-to-length ratio of the driving transistor M3 in the second pixel circuit 122 corresponding to the second light-emitting element. In this way, in the pixel circuit 12 connected to the light-emitting elements 11 with the same light-emission color, since the channel width-to-length ratios of the driving transistors M3 in the first pixel circuit 121 and the second pixel circuit 122 are different, the channel width-to-length ratios of the driving transistor M3 in the first pixel circuit 121 and the second pixel circuit 122 can be differentiated, so that the length of the driving transistor M3 in the first pixel circuit 121 in the first direction X is smaller than the length of the driving transistor M3 in the first pixel circuit 121 in the second direction Y, so as to reduce the length of the first pixel circuit 121 in the first direction X, and make the length of the driving transistor M3 in the second pixel circuit 122 in the first direction X greater than the length of the driving transistor M3 in the second pixel circuit 122 in the second direction Y.

Figure 14:
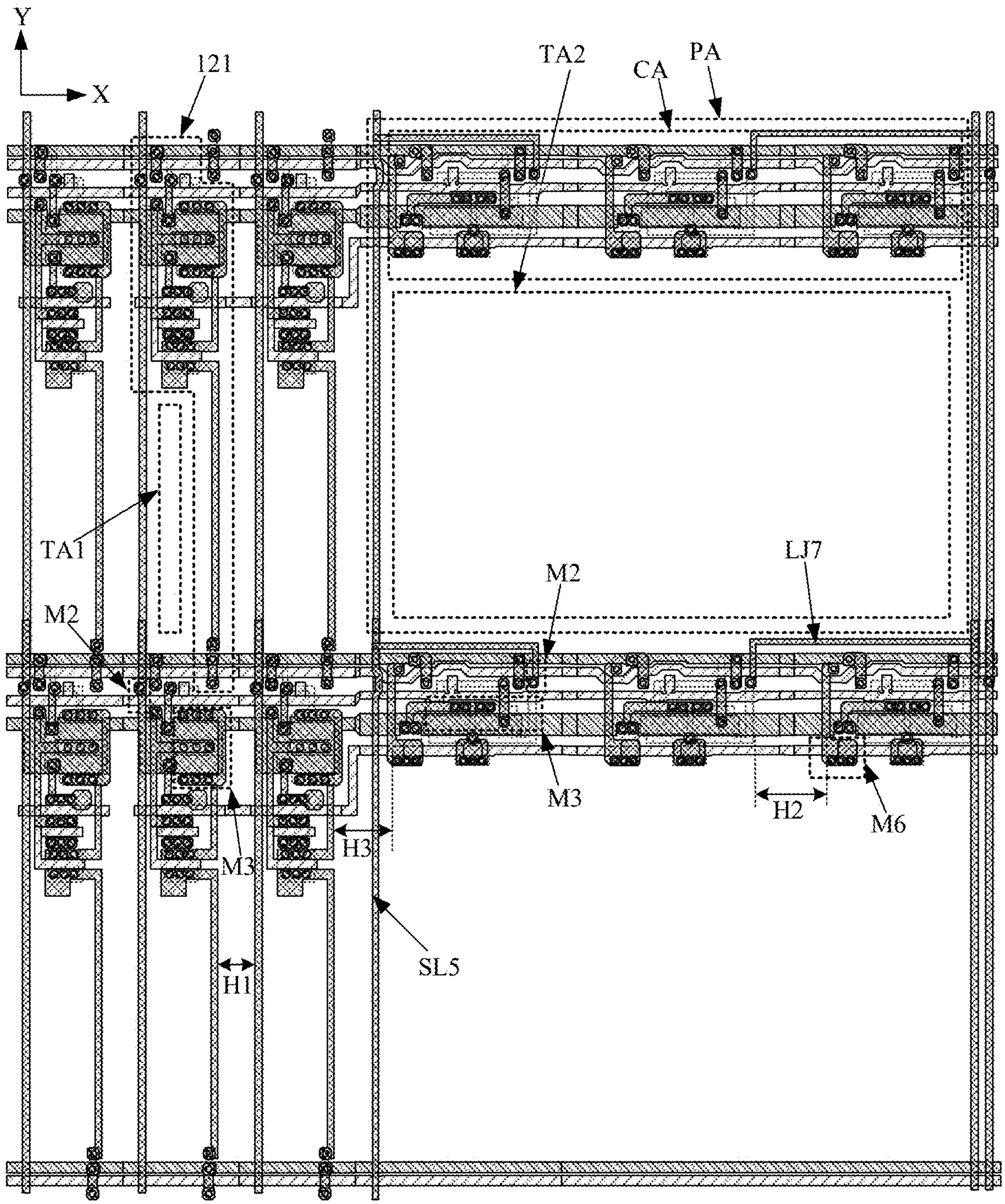
FIG. 14 is a layout of a pixel circuit in a display panel provided in an embodiment of the present application.
Figure 15:
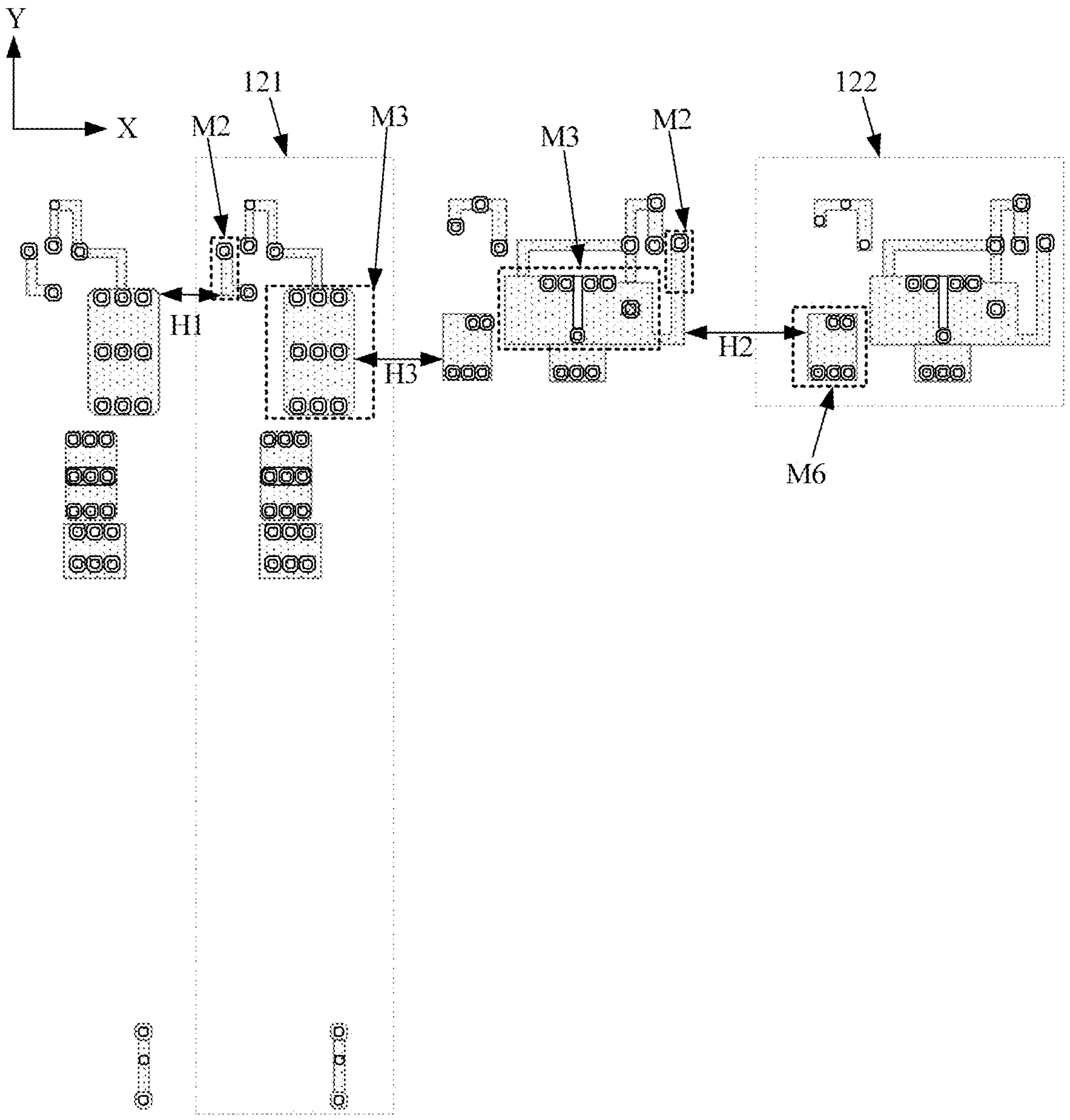
FIG. 15 is a layout of a polysilicon layer where active regions of transistors corresponding to adjacent two of the first pixel circuits and adjacent two of the second pixel circuits in a same row of FIG. 14 are located.

Referring to FIGS. 14 and 15, FIG. 14 is a layout of a pixel circuit in a display panel provided in an embodiment of the present application, and FIG. 15 is a layout of the polysilicon layer where the active regions of the transistors corresponding to adjacent two of the first pixel circuits and adjacent two of the second pixel circuits in the same row of FIG. 14 are located.

As shown in FIG. 14 and FIG. 15, in one implementation of the embodiments of the present application, the distance H1 between adjacent two of the first pixel circuits 121 in the first direction X is set to be smaller than the distance H2 between adjacent two of the second pixel circuits 122 in the first direction X.

In FIG. 14 and FIG. 15, in the first direction X, the spacing distance between active regions of adjacent two of the transistors in adjacent two of the pixel circuits 12 represents the distance between adjacent two of the pixel circuits 12. As shown in FIG. 14, in the first direction X, the distance H1 between adjacent two of the first pixel circuits 121 is the space distance between the active region of the driving transistor M3 in the first pixel circuit 121 on the left side and the active region of the data writing transistor M2 in the first pixel circuit 121 on the right side; the distance H3 between the adjacent first pixel circuit 121 and the second pixel circuit 122 is the spacing distance between the active region of the driving transistor M3 in the first pixel circuit 121 and the active region of the second light-emitting control transistor M6 in the second pixel circuit 122; the distance H2 between adjacent two of the second pixel circuits 122 is the spacing distance between the active region of the data writing transistor M2 in the second pixel circuit 122 on the left side and the active region of the second light-emitting control transistor M6.

In the arrangement shown in FIG. 14 and FIG. 15, setting H1<H2 can make the pixel circuits 12 in the first area AA1 have a smaller spacing distance, so as to facilitate the arrangement of more first pixel circuits 121, and can also reduce the length compressions of the first pixel circuits 121 in the first direction X.

Optionally, in the first area AA1, the distance H1 between the first pixel circuits 121 can be gradually increased along the first direction X. In the second area AA2, the distance H2 between the second pixel circuits 122 can be gradually decreased along the first direction X. If used for a transparent display panel, the gradual-changed setting of H1 and H2 can ensure that the lengths of the transparent areas TA in the first area AA1 and the second area AA2 along the first direction X are gradually changed, so as to realize the gradual-changed distribution of different transparent areas TA of the transparent display panel, and reduce the relatively large difference in the lengths of the transparent areas TA in the first direction X, thereby preventing the problem of uneven transparent display caused by the relatively large difference in the lengths of the transparent areas TA in the first direction X.

In the embodiments of the present application, for the first pixel circuit 121, as shown in FIG. 14, the data line SL5 and the first pixel circuit 121 connected thereto can be arranged in sequence in the first direction X.

In the second area AA2, as shown in FIG. 14, for three second pixel circuits 122 arranged continuously in the first direction X in the same pixel area, the data line SL5 connected to the second pixel circuit 122 close to the first area AA1 is located on one side of the second pixel circuit 122 facing the first area AA1; the data lines SL5 connected to the other two second pixel circuits 122 are located on one side of the pixel area facing away from the first area AA1, and the data lines SL5 connected to the two second pixel circuits 122 are connected to the corresponding data writing transistor M2 based on the connection line LJ7 extending along the first direction X. This arrangement can make the data lines SL5 connected to multiple second pixel circuits 122 in the same pixel area be arranged in two parts on both sides of the pixel area in the first direction X, so as to prevent the problem of wide wiring shading area caused by the data lines SL5 on the same side of the pixel area.

Figure 16:
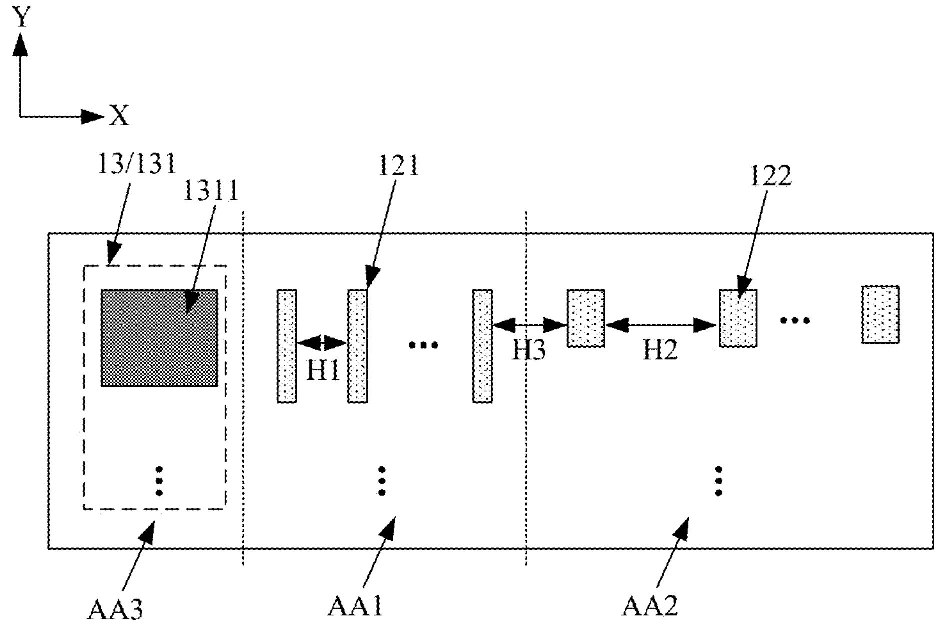
FIG. 16 is a schematic diagram of an arrangement of a pixel circuit and a driving circuit in a display panel provided in an embodiment of the present application.

Referring to FIG. 16, FIG. 16 is a schematic diagram of an arrangement of a pixel circuit and a driving circuit in a display panel provided by an embodiment of the present application. In combination with FIG. 15 and FIG. 16, if H1 is less than H2, the first shift register 1311 can be disposed to be located on one side of the first pixel circuit 121 facing away from the second pixel circuit 122. In this way, the pixel circuit 12 in the third area AA3 can be directly formed in the first area AA1 as the first pixel circuit 121, and only the circuit layout in the adjacent first area AA1 and the third area AA3 needs to be changed, simplifying the circuit layout design.

In this arrangement, the first shift register 1311 is disposed on one side of the first pixel circuit 121 facing away from the second pixel circuit 122, avoiding the first shift register 1311 from being inserted between the first pixel circuits 121 to increase the distance H1 between the first pixel circuits 121, so as to satisfy H1<H2. In addition, as described above, the first driving circuit 131 can be located in the third area AA3, and the third area AA3 does not overlap the second area AA2, so that the first driving circuit 131 and the first pixel circuit 121 can be respectively formed in different sub-display areas of the display area. Moreover, if the first shift register 1311 is located on one side of the first pixel circuit 121 facing away from the second pixel circuit 122, the third area AA3 can be located on one side of the first area AA1 facing away from the second area AA2, and the distance H3 between the first pixel circuit 121 and the adjacent second pixel circuit 122 can be greatly reduced compared to the arrangement of disposing the first shift register 1311 between the first pixel circuit 121 and the second pixel circuit 122.

In one implementation of the embodiments of the present disclosure, if H1<H2, further, the distance H2 between adjacent two of the second pixel circuits 122 in the first direction X can be set to be greater than the distance H3 between the second pixel circuit 122 and its adjacent first pixel circuit 121, at this time H1<H2, and H2>H3. Based on this arrangement, H1 can be further set, H3 and H2 are increased in sequence in the first direction X. When used for transparent display, the lengths of the transparent areas in the first direction X can be gradually changed, so that the lengths of the transparent areas TA in the first direction X are uniformly transitioned to achieve a more uniform transparent display effect.

In the embodiments of the present application, if H1<H2, further, the distance H1 between adjacent two of the first pixel circuits 121 in the first direction X can be set to be smaller than the distance H3 between the first pixel circuit 121 and the adjacent second pixel circuit 122. At this time, H1<H2, and H1<H3.

Figure 17:
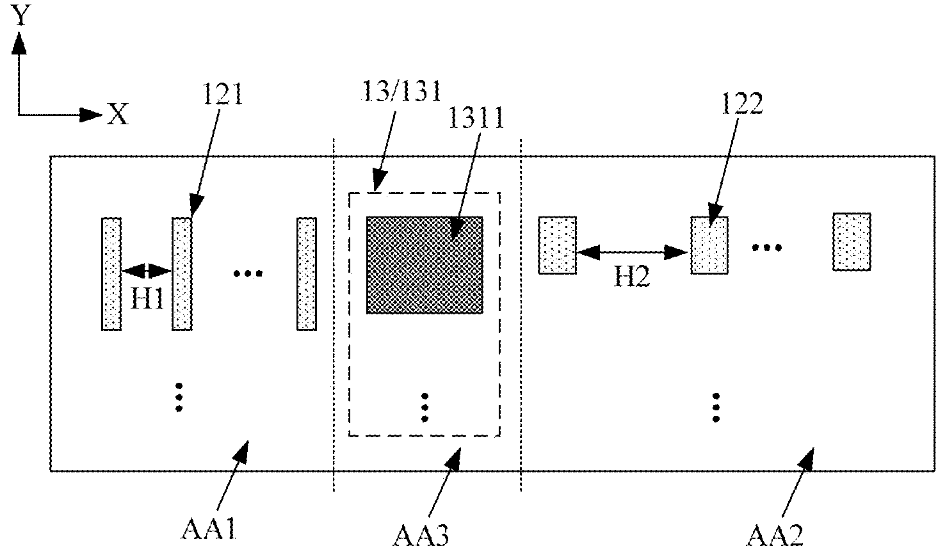
FIG. 17 is a schematic diagram of an arrangement of a pixel circuit and a driving circuit in a display panel provided in an embodiment of the present application.

Referring to FIG. 17, FIG. 17 is a schematic diagram of an arrangement of a pixel circuit and a driving circuit in a display panel provided in an embodiment of the present application. In this arrangement, the first shift register 1311 is disposed to be located on one side of the first pixel circuit 121 close to the second pixel circuit 122. In this arrangement, the first driving circuit 131 is disposed between the first area AA1 and the second area AA2, so that the first driving circuit 131 can provide control signals to the first pixel circuit 121 and the second pixel circuit 122 on both sides respectively, and can reduce the voltage drop of the control signal when the first driving circuit 131 provides the control signal to the same row of pixel circuits 12, so as to reduce the load difference caused by the length of the control signal line in the first direction X.

Since the number of transistors in the first shift register 1311 is greater than the number of transistors in the pixel circuit 12, if used in a transparent display panel, the areas of the transparent areas of the driving circuit 12, the first pixel circuit 121 and the second pixel circuit 122 are reduced in sequence. Based on the arrangement shown in FIG. 17, if used in a transparent display panel, the third area AA3 is located between the first area AA1 and the second area AA2, so that when a large-size transparent display apparatus is formed by splicing multiple transparent display panels, the low transmittance of the splicing edges can be avoided.

As described above, the first determination circuit 131 is located in the third area AA3, the first pixel circuit 121 is located in the first area AA1, and the second pixel circuit 122 is located in the second area AA2. The first shift register 1311 is located on one side of the first pixel circuit 121 close to the second pixel circuit 122, so that the third area AA3 can be located between the first area AA1 and the second area AA2.

In the arrangement shown in FIG. 17, the distance between adjacent two of the second pixel circuits 122 in the first direction X is less than the distance between the second pixel circuit 122 and its adjacent first pixel circuit 121, that is, H2<H3. This arrangement is suitable for disposing the third area AA3 between the first area AA1 and the second area AA2. Based on the larger size H3, the first shift register 1311 with a longer length in the first direction X can be arranged, so as to facilitate provision of the third area AA3 between the first area AA1 and the second area AA2, and the arrangement of the first driving circuit 131 between the first area AA1 and the second area AA2.

Figure 18:
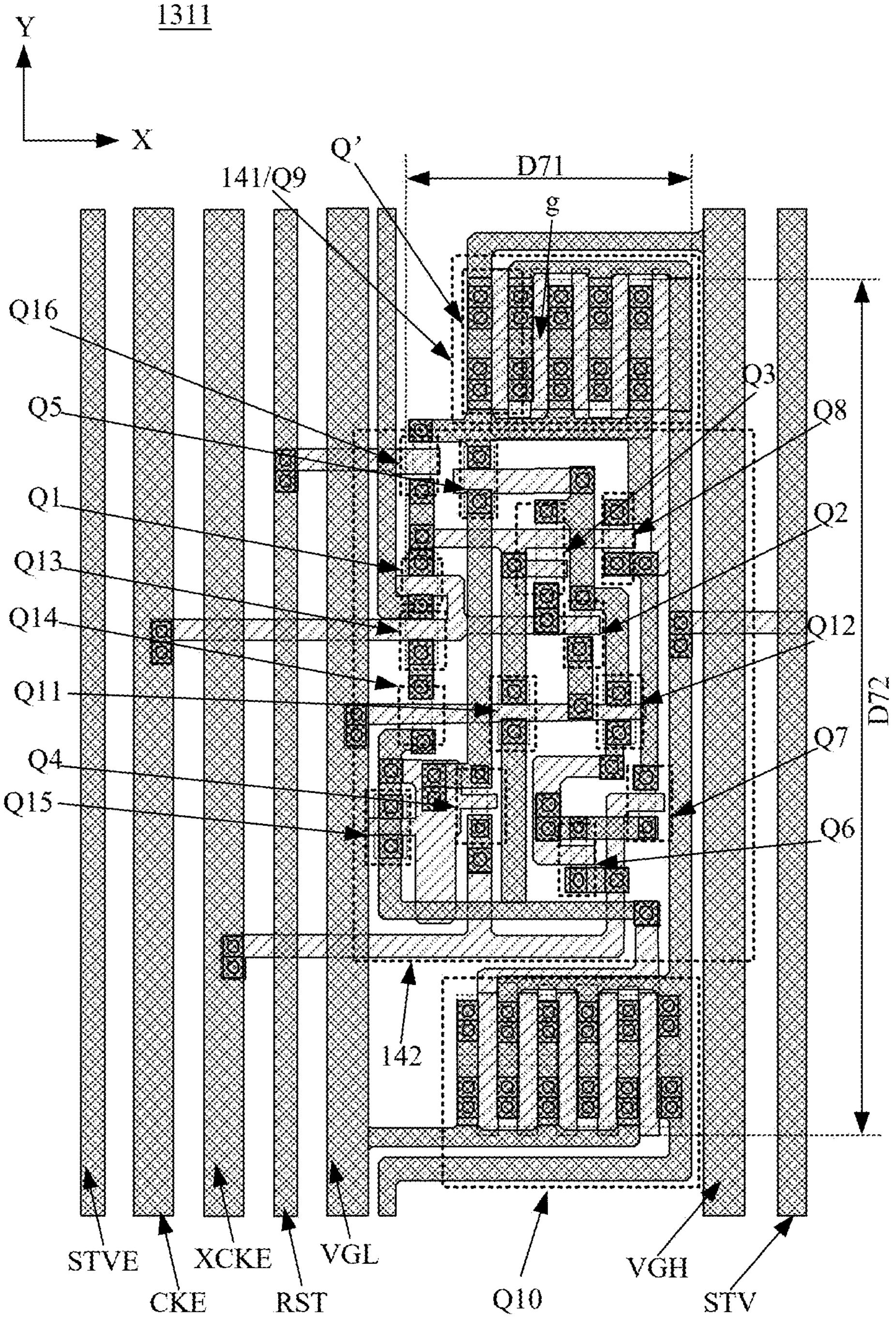
FIG. 18 is a layout of a first shift register in the display panel provided in an embodiment of the present application.
Figure 19:
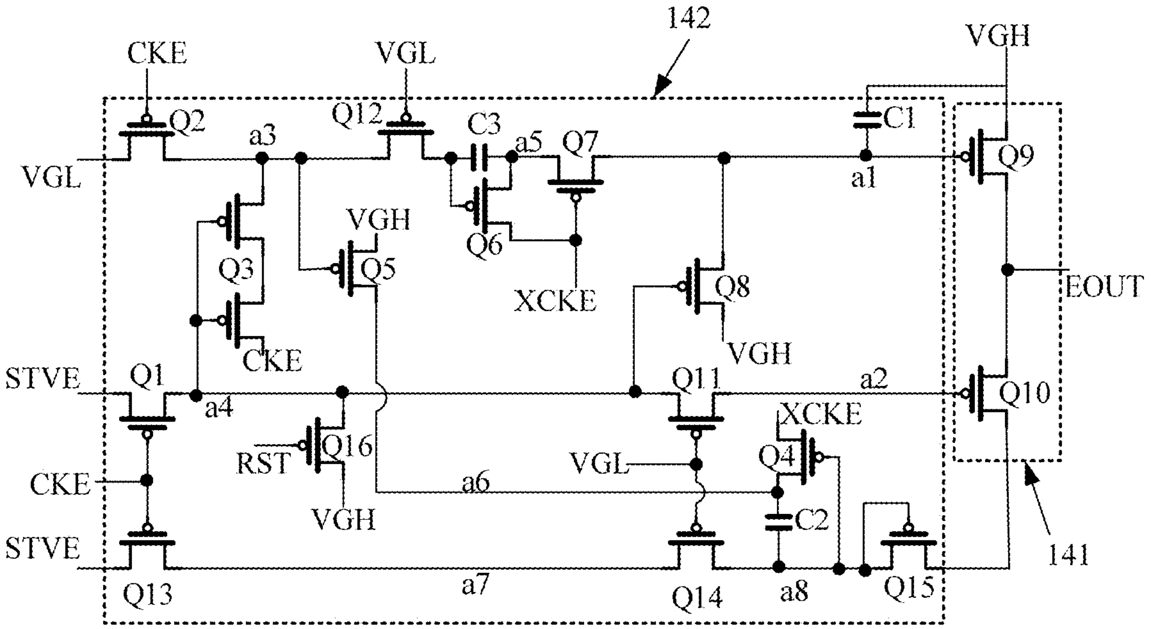
FIG. 19 is a circuit diagram of the first shift register shown in FIG. 18.

Referring to FIG. 18 and FIG. 19, FIG. 18 is a layout of a first shift register in a display panel provided in an embodiment of the present application, and FIG. 19 is a circuit diagram of the first shift register shown in FIG. 18. The length of the first shift register 1311 in the second direction Y is greater than the length of the first shift register 1311 in the first direction X.

In the arrangements shown in FIG. 18 and FIG. 19, by increasing the length of the first shift register 1311 in the second direction Y, the length of the first shift register 1311 in the first direction X can be compressed, and when the first driving circuit 131 is disposed in the display area, the arrangement space of the first shift register 1311 in the first direction X can be reduced.

The first shift register 1311 includes sixteen transistors and three capacitors, the sixteen transistors are sequentially the first transistor Q1 to the sixteenth transistor Q16, and the three capacitors are sequentially the first capacitor C1 to the third capacitor C3.

The first shift register 1311 includes a first output module 141, and the first output module 141 includes a first output transistor and a second output transistor. The ninth transistor Q9 is used as the first output transistor, and the tenth transistor Q10 is used as the second output transistor. The first output module 141 can respond to the control of the gate access signal, so that the first output transistor Q9 and the second output transistor Q10 are turned on in time division, so as to output high level VGH and low level VGL in time sequence through the output terminal EOUT.

The first electrode of the first transistor Q1 in the first shift register 1311 is connected to the signal STVE, the second electrode is connected to the node a4, and the gate is connected to the clock signal CKE. The first electrode of the thirteenth transistor Q13 is connected to the signal STVE, the second electrode is connected to the node a7, and the gate is connected to the clock signal CKE. The first electrode of the second transistor Q2 is connected to the low level VGL, the second electrode is connected to the node a3, and the gate is connected to the clock signal CKE. The first electrode of the third transistor Q3 is connected to the node a3, the second electrode is connected to the clock signal CKE, and the gate is connected to the node a4. The third transistor Q3 can be a dual-gate transistor. The first electrode of the fifth transistor Q5 is connected to the high level VGH, the second electrode is connected to the node a6, and the gate is connected to the node a3. The first electrode of the sixteenth transistor Q16 is connected to the node a4, the second electrode is connected to the high level VGH, and the gate is connected to the signal RST. The first electrode of the twelfth transistor Q12 is connected to the node a3, the second electrode is connected to the node a5 through the third capacitor C3, and the gate is connected to the low level VGL. The first electrode of the sixth transistor Q6 is connected to the node a5, the second electrode is connected to the clock signal XCKE, and the gate is connected to the second electrode of the twelfth transistor Q12. The first electrode of the seventh transistor Q7 is connected to node a5, the second electrode is connected to node a1, and the gate is connected to the clock signal XCKE. The first electrode of the eighth transistor Q8 is connected to node a1, the second electrode is connected to the high level VGH, and the gate is connected to node a4. The first electrode of the ninth transistor Q9 is connected to the high level VGH, the second electrode is connected to the output terminal OUT, and the gate is connected to node a1. The gate of the ninth transistor Q9 is connected to the first electrode through the first capacitor C1. The first electrode of the eleventh transistor Q11 is connected to node a4, the second electrode is connected to node a2, and the gate is connected to the low level VGL. The first electrode of the fourth transistor Q4 is connected to the clock signal XCKE, the second electrode is connected to node a6, and the gate is connected to node a8 through the second capacitor C2. The first electrode of the fourteenth transistor Q14 is connected to node a7, the second electrode is connected to node a8, and the gate is connected to the low level VGL. The first electrode and gate of the fifteenth transistor Q15 are both connected to node a8, and the second electrode is connected to the second electrode of the tenth transistor Q10. The gate of the tenth transistor Q10 is connected to node a2, and the first electrode is connected to the output terminal OUT.

Figure 20:
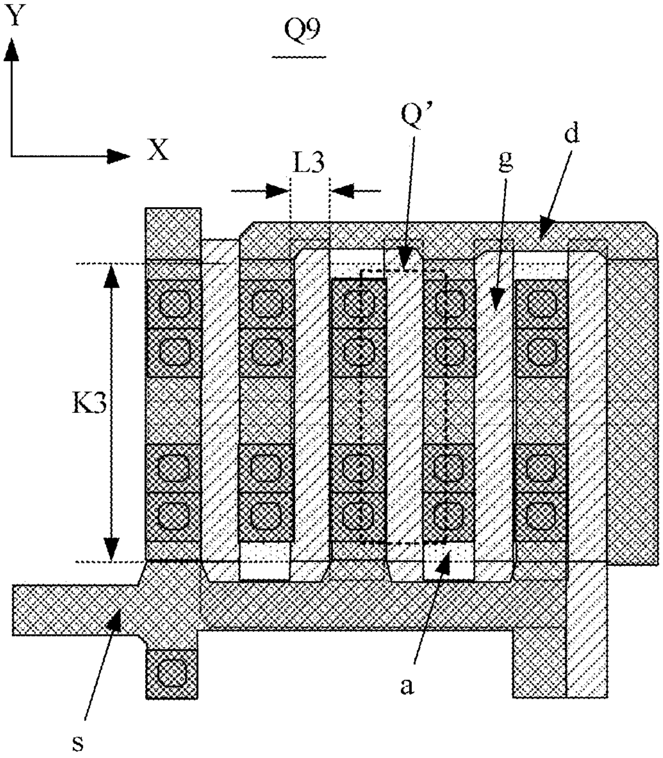
FIG. 20 is a layout of a first output transistor in the first shift register.

Referring to FIG. 20, FIG. 20 is a layout of the first output transistor in the first shift register, the channel length direction of the first output transistor Q9 is parallel to the first direction X, and the channel width direction of the first output transistor Q9 is parallel to the second direction Y.

Figure 21:
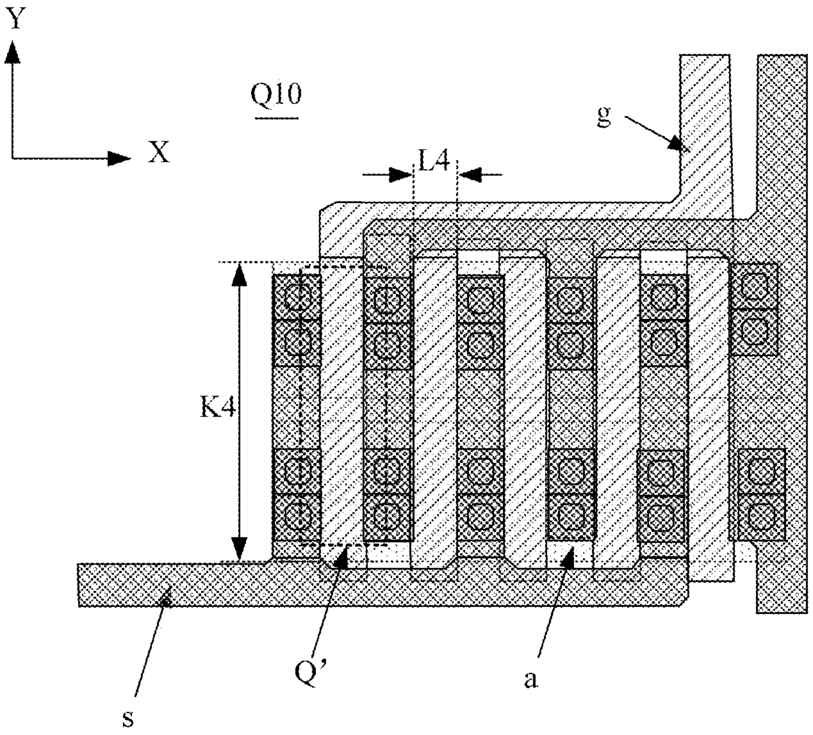
FIG. 21 is a layout of a second output transistor in the first shift register.

Referring to FIG. 21, FIG. 21 is a layout of the second output transistor in the first shift register, the channel length direction of the second output transistor is parallel to the first direction X, and the channel width direction of the second output transistor Q10 is parallel to the second direction Y.

The first output transistor Q9 and the second output transistor Q10 each have a plurality of sub-transistors connected in parallel to increase the driving capability of the first output transistor Q9 and the second output transistor Q10. As described above, in the same transistor, the gates g of the respective sub-transistors are connected, the first electrodes s of the respective sub-transistors are connected, and the second electrodes d of the respective sub-transistors are connected, wherein L3 represents the channel length of the sub-transistor in the first output transistor Q9, and K3 represents the channel width of the sub-transistor in the first output transistor Q9; L4 represents the channel length of the sub-transistor in the second output transistor Q10, and K4 represents the channel width of the sub-transistor in the second output transistor Q10.

In the embodiments of the present application, the channel length direction of the first output transistor Q9 can be set to be parallel to the first direction X, and the channel width direction of the first output transistor Q9 can be set to be parallel to the second direction Y; or, the channel length direction of the second output transistor can be set to be parallel to the first direction X, and the channel width direction of the second output transistor Q10 can be set to be parallel to the second direction Y; or, the channel length direction of the first output transistor Q9 can be set to be parallel to the first direction X, and the channel width direction of the first output transistor Q9 can be set to be parallel to the second direction Y, and the channel width direction of the second output transistor Q10 can be set to be parallel to the second direction Y.

Based on the arrangements shown in FIG. 20 and FIG. 21, in the first shift register 1311, the channel length direction of at least one output transistor is set to be parallel to the first direction X, and the channel width direction is set to be parallel to the second direction Y, so that the length of the output transistor in the first direction X can be reduced, thereby reducing the length of the first shift register 1311 in the first direction X.

As shown in FIG. 18 and FIG. 19, along the second direction Y, the first switch module 142 is located between the first output transistor Q9 and the second output transistor Q10. In this arrangement, the other transistors of the first shift register 1311 can be disposed between the first output transistor Q9 and the second output transistor Q10, so that the length of the first shift register 1311 in the first direction X is less than the length of the first shift register 1311 in the second direction Y, so as to reduce the arrangement space of the first shift register 1311 in the first direction X, wherein the other transistors in the first shift register 1311 except the first output transistor Q9 and the second output transistor Q10 are connected as the first switch module 142 as shown in FIG. 19. In addition, since this arrangement can reduce the length of the first driving circuit 131 in the first direction X, the number of first pixel circuits 121 that need to be shortened by the length in the first direction X can be reduced, which is conducive to reducing the number of connecting lines between the light-emitting element 11 in the third area AA3 and the first pixel circuit 121 in the first area AA1, thereby saving for the wiring space. When used in a transparent display panel, the areas of the transparent areas TA can be increased, and the transparent display effect can be improved.

Optionally, the first driving circuit 131 provides a light-emitting control signal EMIT for the light-emitting control transistor of the pixel circuit 12. In this way, the first shift register 1311 in the first driving circuit 131 in the driving circuit 13, which is at least used to provide the light-emitting control signal EMIT to the pixel circuit 12, is disposed in the display area of the display panel, which can save for the border area of the display panel for arranging the first shift registers 13111.

Figure 22:
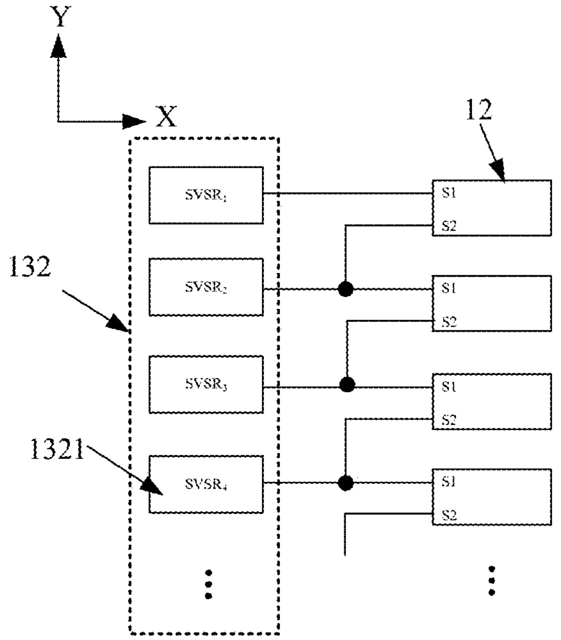
FIG. 22 is a schematic diagram of a cascade relationship of a second shift register in a second driving circuit.
Figure 23:
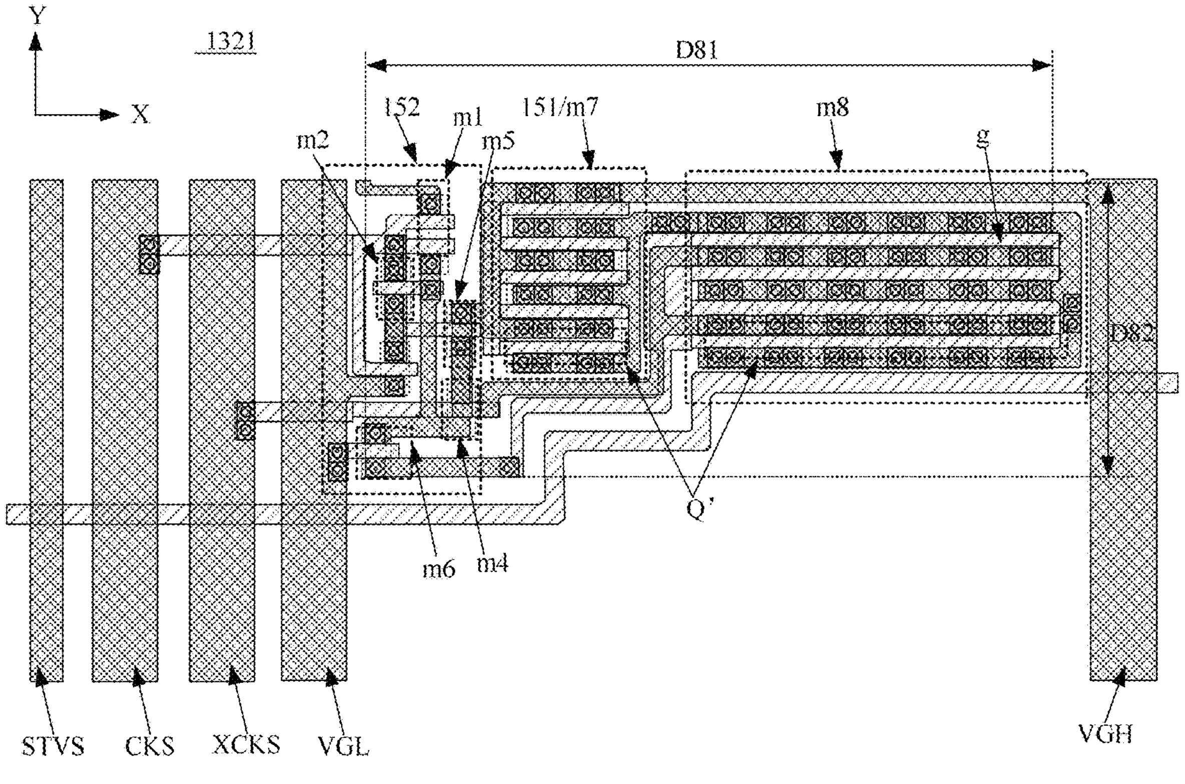
FIG. 23 is a layout of a second shift register provided in an embodiment of the present application.
Figure 24:
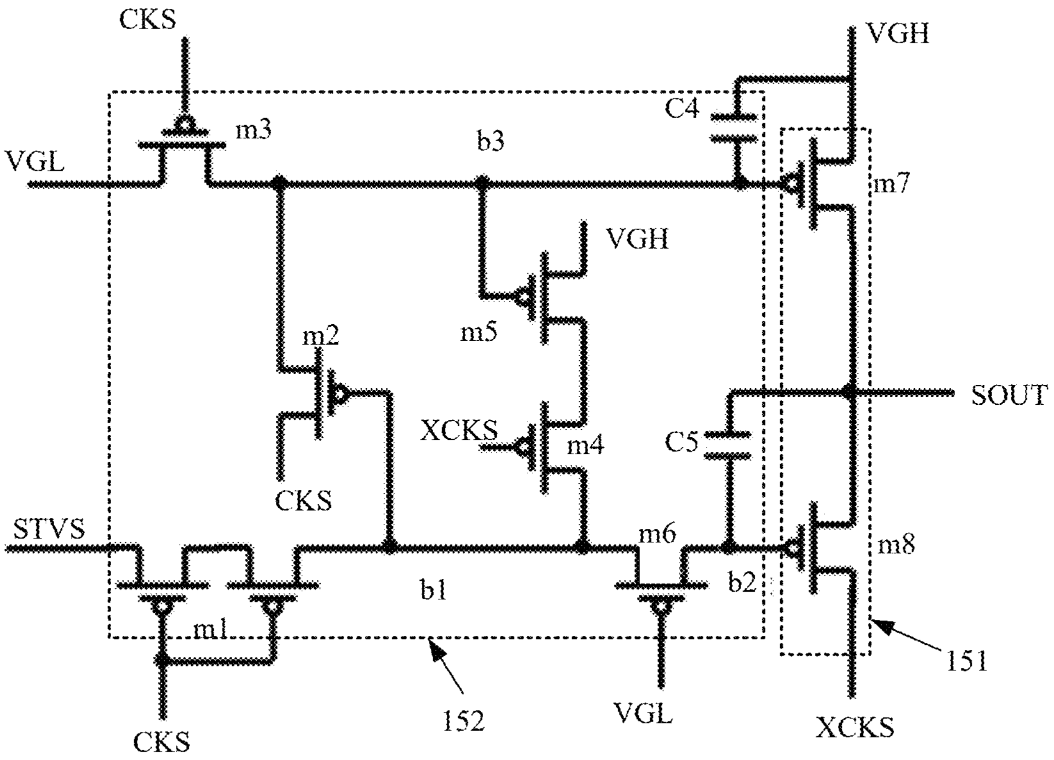
FIG. 24 is a circuit diagram of the second shift register.

Referring to FIGS. 22-24, FIG. 22 is a schematic diagram of a cascade relationship of the second shift register in the second driving circuit, FIG. 23 is a layout of a second shift register provided in an embodiment of the present application, and FIG. 24 is a circuit diagram of the second shift register. On the basis of any one of the above implementations, the driving circuit 13 also includes: a second driving circuit 132, and the second driving circuit 132 includes a plurality of second shift registers 1321 cascaded along the second direction Y.

Comparing FIGS. 18 and 23, in the implementations of the present application, the length D72 of the first shift register 1311 in the second direction Y is set to be greater than the length D82 of the second shift register 1321 in the second direction Y, and/or the length D71 of the first shift register 1311 in the first direction X is set to be less than the length D81 of the second shift register 1321 in the first direction.

When D72>D82, and/or, D71<D81, relative to the second shift register 1321, the first shift register 1311 can have a longer length in the second direction Y and a shorter length in the first direction X. The length D72 of the first shift register 1311 in the second direction Y can be increased to reduce the length of the first shift register 1311 in the first direction X. By sacrificing the arrangement in the second direction Y, the arrangement space of the first driving circuit 131 in the first direction X is reduced, and the relative border width of the display panel in the first direction can be reduced.

As shown in FIG. 22, in the second driving circuit 132, there are N second shift registers 1321 cascaded in sequence in the second direction Y, and N is a positive integer greater than 1. Along the second direction Y, the N second shift registers 1321 are $SVSR_1$, $SVSR_2$, $SVSR_3$, . . . , $SVSR_N$ in sequence, and the output signals of the N second shift registers 1321 are $SOUT_1$, $SOUT_2$, $SOUT_3$, . . . . $SOUT_N$ in sequence. The N second shift registers 1321 are arranged in sequence along the second direction Y, and the output of the front second shift register 1321 is used as the input of the next second shift register 1321 to realize the sequential cascading of each second shift register 1321. Optionally, the output signal SOUT of the second shift register 1321 at each stage can be used as the first scanning signal S1 or the second scanning signal S2 of the pixel circuit 12.

For the convenience of illustration, only one column of pixel circuits 12 is shown in FIG. 22. In the second driving circuit 1321, the output signal $SOUT_1$ of the second shift register $SVSR_1$ at a first stage is used as the first scanning signal S1 of the pixel circuit at a first row. The output signal $SOUT_j$ of the second shift register $SVSR_j$ at a j-th stage is used as the first scanning signal S1 of the pixel circuit at a j-th row, and as the first scanning signal S2 of the pixel circuit 12 at a j−1-th row, where j is a positive integer greater than 1 and not greater than N.

In an arrangement shown in FIG. 22, the pixel circuit 12 at each row corresponds to a second shift register 1321 at one stage, and the second shift register 1321 at each stage is used to provide a first scanning signal for the pixel circuit 12 at one row, which is a one-to-one driving mode. In other arrangements, the second shift register 1321 at each stage can also be set to correspond to multiple rows of pixel circuits 12 to provide first scanning signals for multiple rows of pixel circuits 12 at the same time, so as to realize a one-to-many driving mode.

As shown in FIG. 24, the second shift register 1321 includes 8 transistors and 2 capacitors, the 8 transistors are the seventeenth transistor m1 to the twenty-fourth transistor m8 in sequence, and the two capacitors are the fourth capacitor C4 and the fifth capacitor C5, respectively.

The first electrode of the seventeenth transistor m1 is connected to the signal STVS, the second electrode is connected to the node b1, and the gate is connected to the clock signal CKS. The seventeenth transistor m1 can be a dual-gate transistor. The first electrode of the eighteenth transistor m2 is connected to the node b3, the second electrode is connected to the clock signal CKS, and the gate is connected to the node b1. The first electrode of the nineteenth transistor m3 is connected to the low level VGL, the second electrode is connected to the node b3, and the gate is connected to the clock signal CKS. The first electrode of the twenty-first transistor m5 is connected to the high level VGH, the gate is connected to the node b3, and the second electrode is connected to the first electrode of the twentieth transistor m4. The gate of the twentieth transistor m4 is connected to the clock signal XCKS, and the second electrode is connected to the node b1. The first electrode of the twenty-second transistor m6 is connected to the node b1, the second electrode is connected to the node b2, and the gate is connected to the low level VGL. The gate of the twenty-third transistor m7 is connected to the node b3, and is connected to the first electrode through the capacitor C4, and the first electrode is connected to the high level VGH, and the second electrode is connected to the output terminal SOUT. The gate of the twenty-fourth transistor m8 is connected to the node b2, and is connected to the first electrode through the capacitor C5, the first electrode is connected to the output terminal SOUT, and the second electrode is connected to the clock signal XCKS.

The second shift register 1321 includes a second output module 151, and the second output module 151 includes transistors for signal output including the twenty-third transistor m7 and the twenty-fourth transistor m8. The second output module 151 can respond to the control of the gate access signal, so that the twenty-third transistor m7 and the twenty-fourth transistor m8 are turned on in time division, so as to output the high level VGH and the low level VGL in sequence through the output terminal SOUT.

Optionally, in the second shift register 1321, the twenty-third transistor m7 and the twenty-fourth transistor m8 each have a plurality of sub-transistors Q' connected in parallel to increase the driving capability of the transistors m7 and m8.

In the second shift register 1321, the gate g in the sub-transistor Q' extends along the first direction X, so the channel length direction of the sub-transistor Q' is parallel to the second direction Y, and the channel width direction is parallel to the first direction X. This arrangement can make the length of the second shift register 1321 in the first direction X greater than the length of the second shift register 1321 in the second direction Y, and ensure that the output transistor in the second shift register 1321 has a larger channel width-to-length ratio while making the second shift register 1321 have a smaller length in the second direction Y, so as to ensure the driving capability of the second shift register 1321.

In the embodiments of the present application, the channel length direction of the twenty-third transistor m7 can be set to be parallel to the second direction Y, and the channel width direction of the twenty-third transistor m7 can be set to be parallel to the first direction X, so as to reduce the length of the twenty-third transistor m7 in the second direction Y, and/or the channel length direction of the twenty-fourth transistor m8 can be set to be parallel to the second direction Y, and the channel width direction of the twenty-fourth transistor m8 can be set to be parallel to the first direction X, so as to reduce the length of the twenty-fourth transistor m8 in the second direction Y, thereby reducing the length of the second shift register 1321 in the second direction Y.

The second shift register 1321 also includes a second switch module 152, and the second switch module 152, the twenty-third transistor m7 and the twenty-fourth transistor m8 are arranged in sequence along the first direction X, wherein the other transistors other than the twenty-third transistor m7 and the twenty-fourth transistor m8 in the second shift register 1321 are connected as the second switch module 152 as shown in FIG. 24.

The second switch module 152, the twenty-third transistor m7 and the twenty-fourth transistor m8 are arranged in sequence along the first direction X to reduce the length of the second shift register 1321 in the second direction Y. This arrangement can make the length of the second shift register 1321 in the first direction X greater than the length of the second shift register 1321 in the second direction Y, and make the second shift register 1321 have a smaller length in the second direction Y. As mentioned above, the second shift register 1321 can be used to provide the first scanning signal S1 or the second scanning signal S2 for the pixel circuit 12. At this time, one second shift register 1321 needs to be connected to the pixel circuit 12 at one row. Since there are many transistors in the second shift register 1321, it is necessary to increase its length in the first direction X to reduce the arrangement space in the second direction Y. When used for transparent display, the areas of the transparent areas TA corresponding to the second shift register 1321 is guaranteed to improve the transparent display effect.

Figure 25:
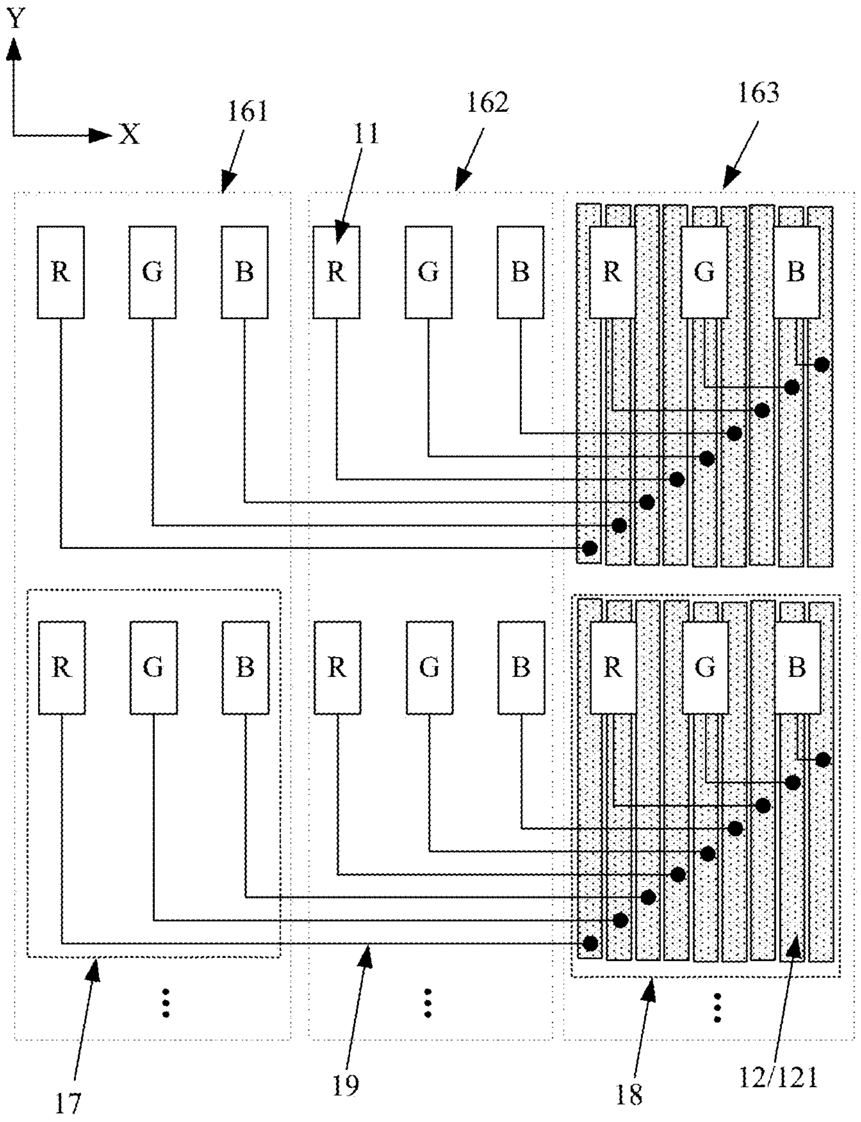
FIG. 25 is a schematic diagram of an arrangement of anode connection lines of light-emitting elements in a display panel provided in an embodiment of the present application.

Referring to FIG. 25, FIG. 25 is a schematic diagram of an arrangement of anode connection lines of light-emitting elements in a display panel provided by an embodiment of the present application. The display panel includes a first pixel column 161, a second pixel column 162 and a first circuit column 163 arranged in sequence along a first direction X; the first pixel column 161 includes pixel 17 arranged along a second direction Y, the second pixel column 162 includes pixel 17 arranged along the second direction Y, and the first circuit column 163 includes a pixel circuit group 18 arranged along the second direction Y; the display panel also includes first anode connection lines 19, the first anode connection lines 19 connect the pixel 17 in the first pixel column 161 to the pixel circuits 12 in the pixel circuit group 18 of the first circuit column 163; the first anode connection lines 19 overlap the second pixel column 162.

In an arrangement shown in FIG. 25, the pixel 17 in the first pixel column 161 can be connected to the pixel circuits 12 in the first circuit column 163 through the corresponding first anode connection lines 19, thereby vacating for the arrangement space of the first driving circuits 131 in the first pixel column 161.

The pixel 17 includes a plurality of light-emitting elements 11 arranged in sequence along the first direction X. The light-emitting elements 11 in the first pixel column 161 and the second pixel column 162 are all connected to the pixel circuits 12 in the first circuit column 163 correspondingly based on the corresponding first anode connection lines 19.

The first pixel column 161 and the second pixel column 162 are located in the third area AA3, and the first circuit column 163 is located in the first area AA1. The pixel circuits 12 in the first circuit column 163 are first pixel circuits 121. The pixel circuit group 18 includes a plurality of first pixel circuits 121 arranged in sequence along the first direction X.

The display panel includes a plurality of pixels 17 arranged in an array, and each of the pixels 17 includes three light-emitting elements 11 with different light-emission colors arranged in sequence in the first direction X, and the three light-emitting elements 11 can be red light-emitting element R, green light-emitting element G and blue light-emitting element B respectively. Each light-emitting element 11 is connected to one pixel circuit 12 correspondingly.

In the first direction X, for the same row of pixels 17, it is set that there are d columns of pixels 17 in the third area AA3 and c pixels 17 in the first area AA1. The pixel circuits 12 connected to the d pixels 17 in the third area AA3 are all arranged as the first pixel circuits 121 in the first area AA1, and the length of the first pixel circuit 121 in the first area AA1 in the first direction X is not greater than P1, and P1 needs to satisfy:

$$P_1 = \frac{c \bullet P_0}{3(d+c)}$$

where P0 is a center space distance between adjacent two of the pixels 17 in the first direction X, the space distance is a pixel pitch. In the second area AA2, each pixel 17 in the first direction X only needs to be disposed to have 3 second pixel circuits 122 required by its three light-emitting elements 11, so the length of the second pixel circuit 122 in the first direction X is not greater than one-third of $P_0$.

$$\text{If } c = d = 3, \text{ then } P_1 = 3 \cdot P_0/18 = P_0/6.$$

Figure 26:
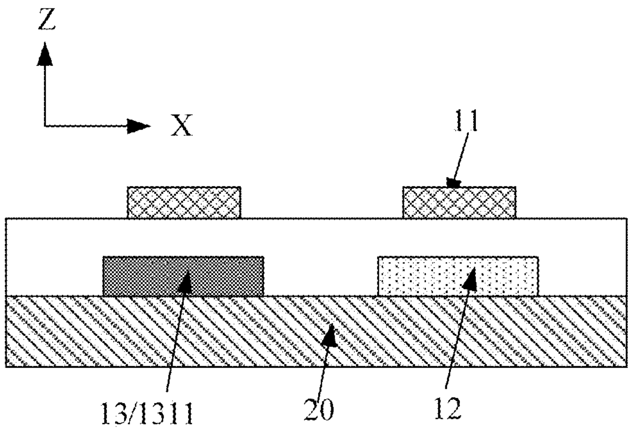
FIG. 26 is a cross-sectional view of a display panel provided in an embodiment of the present application.
Figure 27:
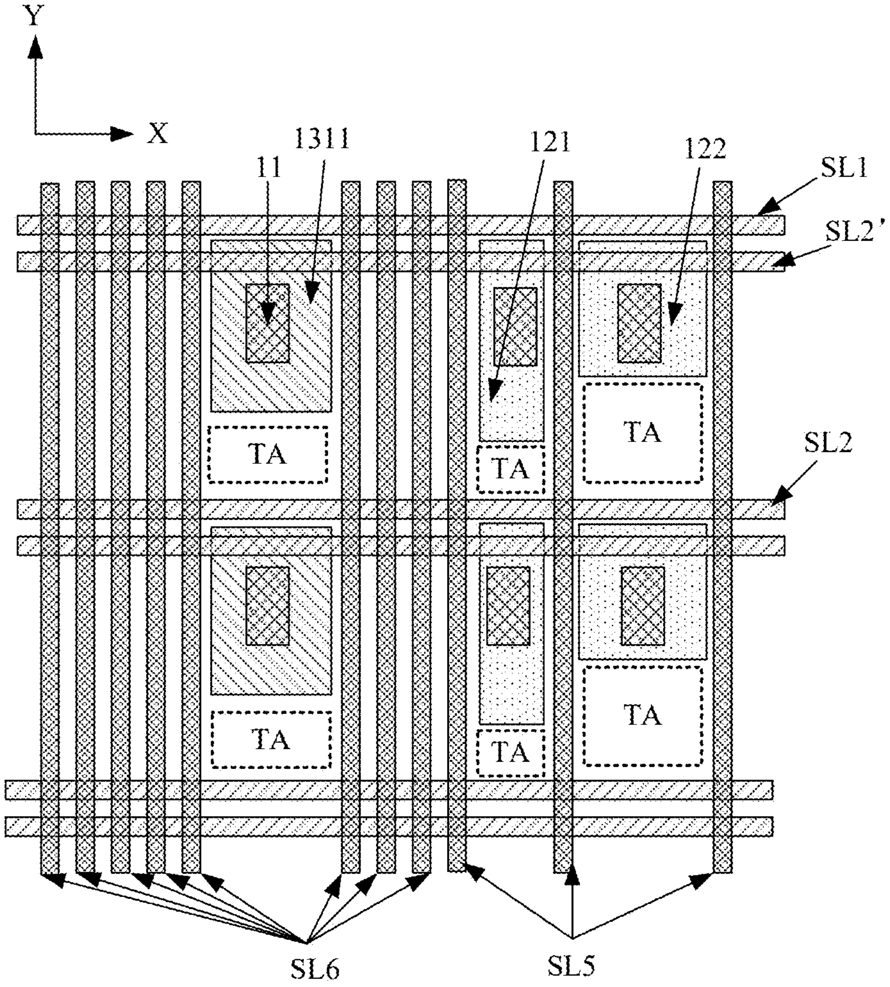
FIG. 27 is a top view of an arrangement of circuits and light-emitting elements in a display panel provided in an embodiment of the present application.

Referring to FIGS. 26 and 27, FIG. 26 is a cross-sectional view of a display panel provided in an embodiment of the present application, and FIG. 27 is a top view of an arrangement of circuits and light-emitting elements in a display panel provided in an embodiment of the present application. Based on any one of the above embodiments, the display panel further includes: a substrate 20, a driving circuit 13 and a pixel circuit 12 located on one side of the substrate 20; in a direction perpendicular to the plane where the substrate 20 is located, the first shift register 1311 at least partially overlaps the light-emitting element 11, wherein the second traces SL6 are a plurality of signal lines extending along the second direction Y connected to the first shift register 1311.

The direction perpendicular to the plane where the substrate 20 is located is set as the third direction Z, and the third direction Z is perpendicular to the first direction X and the second direction Y. In the arrangements shown in FIGS. 26 and 27, the first shift register 1311 and the light-emitting element 11 at least partially overlap in the third direction Z. On the XY plane, the light-emitting element 11 can be arranged in the space above the area where the first shift register 1311 is located, which can save for the arrangement space of the light-emitting elements 11 on the XY plane. In addition, when used for a transparent display panel, this arrangement can use the non-transparent area above the area where the first shift register 1311 is located to arrange the light-emitting elements 11 to avoid the light-emitting elements 11 affecting the areas of the transparent areas.

Optionally, in the third direction Z, the vertical projection of the light-emitting element 11 in the circuit area where the first shift register 1311 is located can be completely located in the circuit area, or can be partially located in the circuit area.

Based on any one of the above embodiments, in the second direction Y, the length of the first pixel circuit 121 can be further set to be greater than the length of the second pixel circuit 122. In this way, by increasing the length of the first pixel circuit 121 in the second direction Y, the arrangement space in the second direction Y can be used to reduce the length of the first pixel circuit 121 in the first direction X, so that a larger number of first pixel circuits 121 can be arranged in the first area AA1, the pixel circuit 12 connected to the light-emitting element 11 in the third area AA3 can be arranged as the first pixel circuit 121 in the first area AA1, and the first driving circuit 131 can be arranged in the third area AA1, the width of the border area relative to the display area in the first direction X can be reduced.

The length of the pixel circuit 12 in the first direction X can be the length occupied by active regions of all transistors in the pixel circuit 12 in the first direction X. The length of the pixel circuit 12 in the second direction Y can be the length occupied by the active regions of all transistors in the pixel circuit 12 in the second direction Y.

For the first pixel circuit 121, if the layout structure shown in FIG. 8 is adopted, the length of the first pixel circuit 121 in the first direction X can be characterized by the distance between the left boundary of the active region of the data writing transistor M2 and the right boundary of the active region of the driving transistor M7; the length of the first pixel circuit 121 in the second direction Y can be characterized by the distance between the upper end of the active region of the first reset transistor M5 and the lower end of the active region of the second reset transistor M7.

For the second pixel circuit 122, if the layout shown in FIG. 9 or FIG. 11 is adopted, the length of the second pixel circuit 122 in the first direction X can be characterized by the distance between the left boundary of the active region of the second light-emitting control transistor M6 and the right boundary of the active region of the data writing transistor M2; the length of the second pixel circuit 122 in the second direction Y can be characterized by the distance between the upper end of the active region of the first reset transistor M5 (or the second reset transistor M7) and the lower end of the active region of the second light-emitting control transistor M6 (or the first light-emitting control transistor M1).

Figure 28:
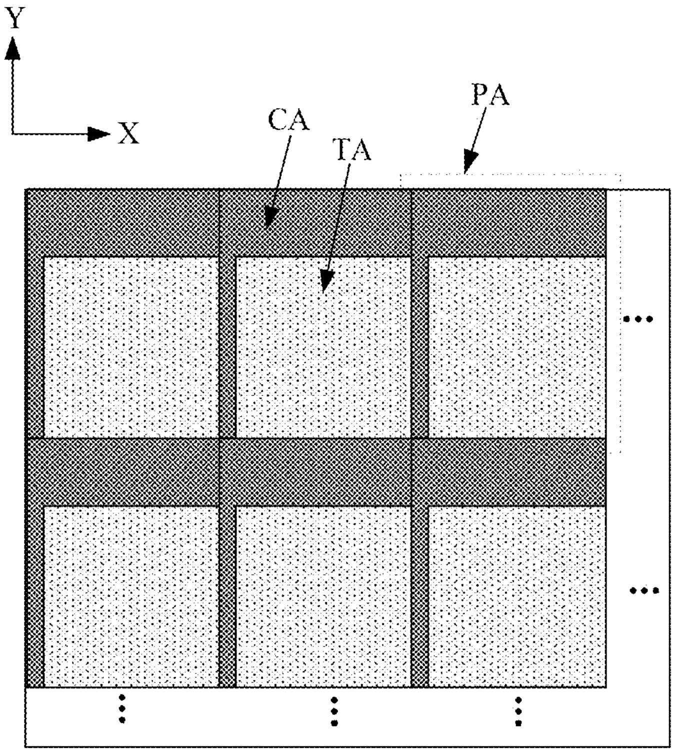
FIG. 28 is a top view of a display area of a display panel provided in an embodiment of the present application.

Referring to FIG. 28, FIG. 28 is a top view of a display area of a display panel provided by an embodiment of the present application. Based on any one of the above embodiments, in combination with the above embodiment drawings and FIG. 28, the display panel includes a pixel area PA, the pixel area PA includes a circuit area CA and a transparent area TA, the driving circuit 13, the pixel circuit 12 and the light-emitting element 11 are located in the circuit area CA;

at least part of the transparent area TA is located between adjacent two of the circuit areas CA in the second direction Y.

In the arrangement shown in FIG. 28, the circuit area CA and the transparent area TA are disposed in the pixel area PA of the display area, the light-emitting element 11, the pixel circuit 12 and the driving circuit 13 are laid out using the circuit area CA, and transparent display can also be achieved through the transparent areas TA. This arrangement can not only realize a transparent display panel, but also reduce the border width, and realize a narrow border or even a borderless design.

Optionally, each pixel area PA can correspond to one pixel 17, and different pixels 17 are located in different pixel areas PA.

Figure 29:
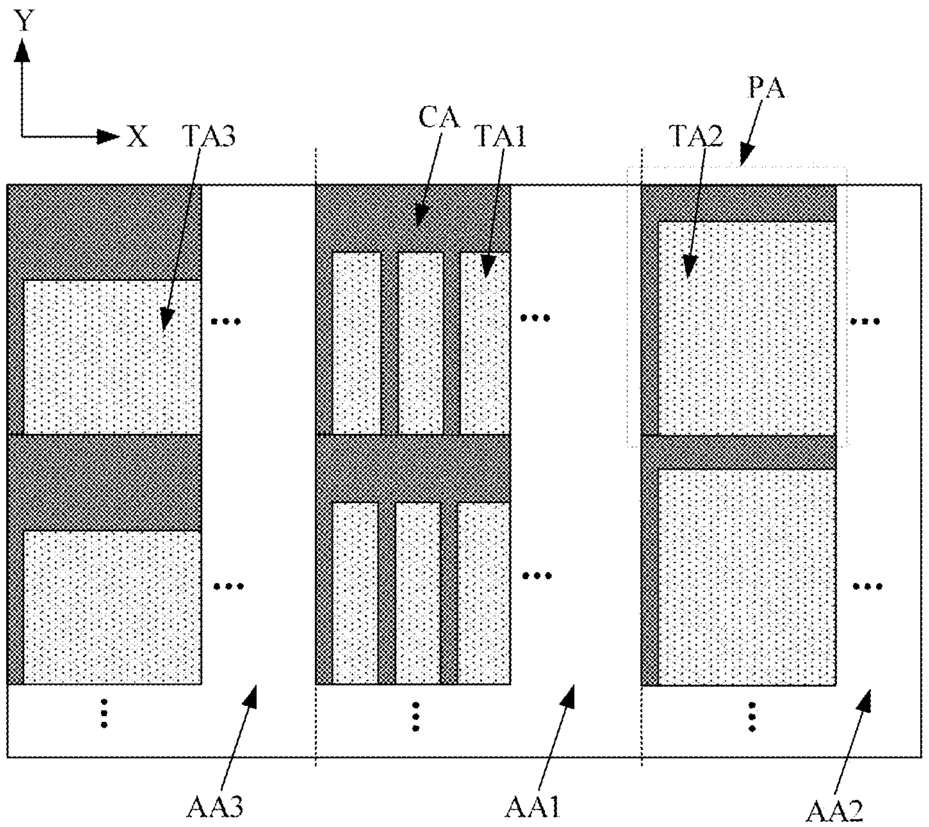
FIG. 29 is a top view of the display area of another display panel provided in an embodiment of the present application.

Referring to FIG. 29, FIG. 29 is a top view of the display area of another display panel provided by an embodiment of the present application. Based on any one of the above embodiments, in combination with the above embodiment drawings and FIG. 29, the transparent area TA of the pixel area PA located in the first area AA1 is set as the first transparent area TA1; the transparent area TA of the pixel area PA located in the second area AA2 is set as the second transparent area TA2; and the transparent area TA of the pixel area PA located in the third area AA3 is set as the third transparent area TA3.

In the first area AA1, for the same pixel area PA, the pixel area PA can be set to have multiple separated first transparent areas TA1 and an integrated circuit area CA, each first pixel circuit 121 is correspondingly disposed with one first transparent area TA1, and respective first transparent areas TA1 are isolated from each other based on the transistors or signal lines in the pixel circuit 12. In the second area AA2, for the same pixel area PA, the pixel area PA can be set to have an integrated second transparent area TA2 and an integrated circuit area CA, and each second pixel circuit 122 corresponds to the same second transparent area TA2. In the third area AA3, for the same pixel area PA, the pixel area PA can be set to have an integrated third transparent area TA3 and an integrated circuit area CA.

Optionally, the transparent areas TA in different areas are set to meet at least one of the following conditions: the area of the first transparent area TA1 being smaller than the area of the second transparent area TA2; the area of the third transparent area TA3 being smaller than the area of the second transparent area TA2; the area of the first transparent area TA1 being smaller than the area of the third transparent area TA3.

For a display panel with a certain size and resolution, the area of the pixel area PA is a certain constant. By setting the area of the first transparent area TA1 smaller than the area of the second transparent area TA2, the area of the transparent area TA in the first area AA1 can be reduced to increase the area of the circuit area CA in the first area AA1, so that more first pixel circuits 121 can be disposed in the pixel area PA in the first area AA1.

Figure 30:
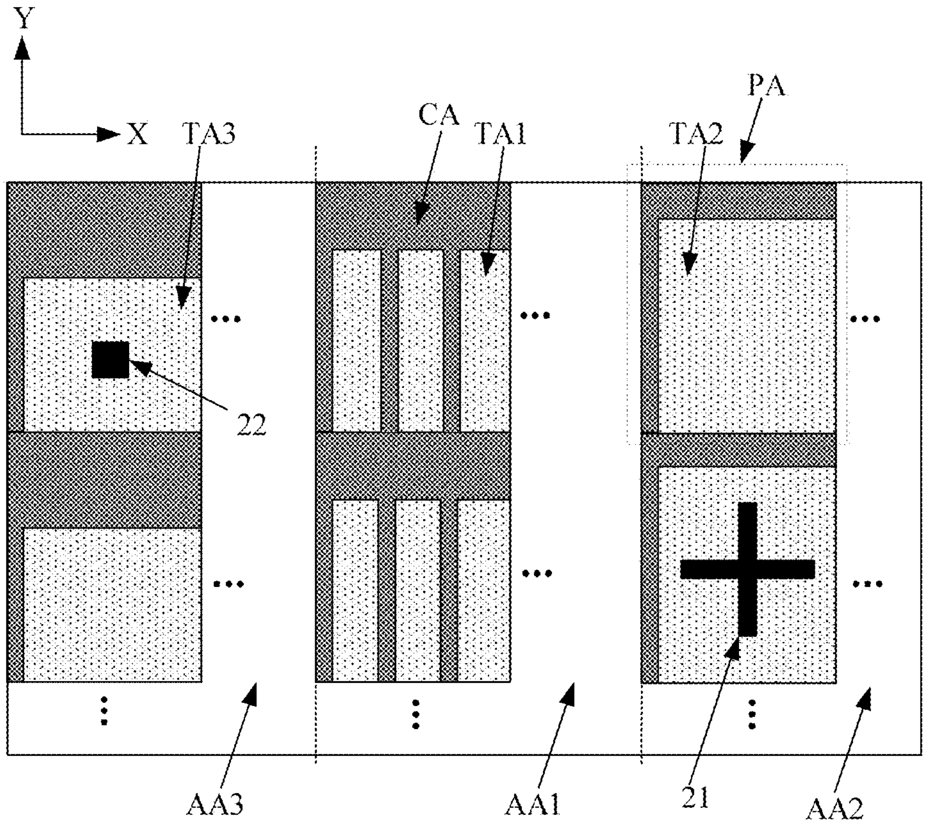
FIG. 30 is a top view of the display area of another display panel provided in an embodiment of the present application.

Referring to FIG. 30, FIG. 30 is a top view of the display area of another display panel provided by an embodiment of the present application. Based on any one of the above embodiments, in combination with the above embodiment drawings and FIG. 30, the display panel further includes a first alignment mark 21 and a second alignment mark 22, and the first alignment mark 21 and the second alignment mark 22 are located in different transparent areas TA respectively.

At most one alignment mark is disposed for each transparent area TA. The number of first alignment marks 21 and second alignment marks 22 in the display panel can be set according to requirements. The number of the first alignment marks 21 and the number of the second alignment marks 22 may not exceed four. The number of alignment marks in the display panel is small. For a display panel with many pixel areas PA, the effect of the alignment marks on light transmittance can be ignored.

Optionally, the areas of the first alignment mark 21 and the second alignment mark 22 are different. For example, the area of the first alignment mark 21 can be set to be larger than the area of the second alignment mark 22, and correspondingly, the area of the transparent area TA provided with the first alignment mark 21 is larger than the area of the transparent area TA provided with the second alignment mark 22.

In one embodiment, the area of the first alignment mark 21 can be set to be larger than the area of the second alignment mark 22. In this case, the first alignment mark 21 with a larger area is used for alignment in the display panel manufacturing process; the second alignment mark 22 is used for alignment in the process of transferring the light-emitting element 11 in the display panel.

Figure 31:
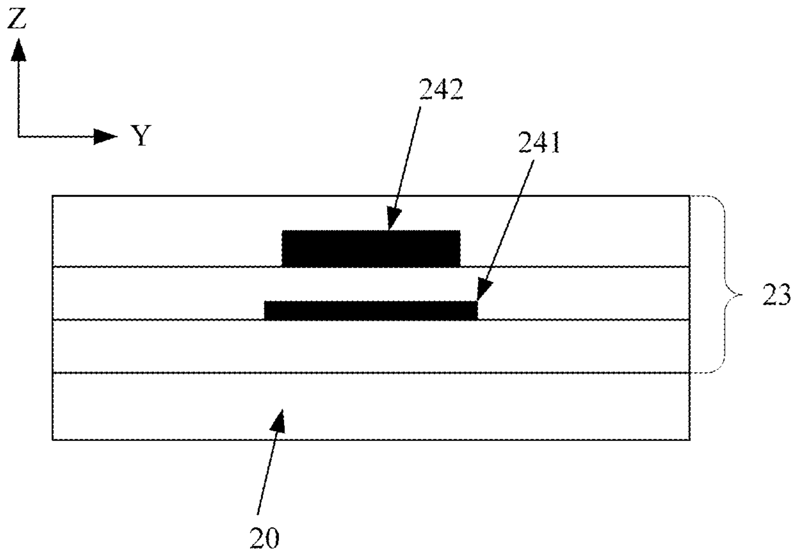
FIG. 31 is a cross-sectional view of a display panel provided in an embodiment of the present application.

Referring to FIG. 31, FIG. 31 is a cross-sectional view of a display panel provided in an embodiment of the present application. On the basis of any one of the above embodiments, in combination with FIG. 31 and the drawings of the above embodiments, the display panel includes a substrate 20 and a driving layer 23 located on one side of the substrate 20, and the driving layer 23 includes a pixel circuit 12 and a driving circuit 13; the driving layer 23 includes a first metal layer 241 and a second metal layer 242, and the second metal layer 242 is located on one side of the first metal layer 241 away from the substrate 20; the first alignment mark 21 is located in the first metal layer 241, and the second alignment mark 22 is located in the second metal layer 242.

The driving layer 23 includes multiple metal layers stacked in sequence in the third direction Z, and any two layers of the multiple metal layers can be used to prepare the alignment mark. Of the two metal layers used to make the alignment mark, the one close to the substrate 20 is used as the first metal layer 24, and the one far from the substrate 20 is used as the second metal layer 242. In the embodiments of the present application, the two metal layers in the reused driving layer 23 are used as the first metal layer 241 and the second metal layer 242, which are used to prepare the first alignment mark 21 and the second alignment mark 22 respectively. There is no need to add a separate metal layer to prepare the alignment mark, which can reduce the thickness of the panel.

Figure 32:
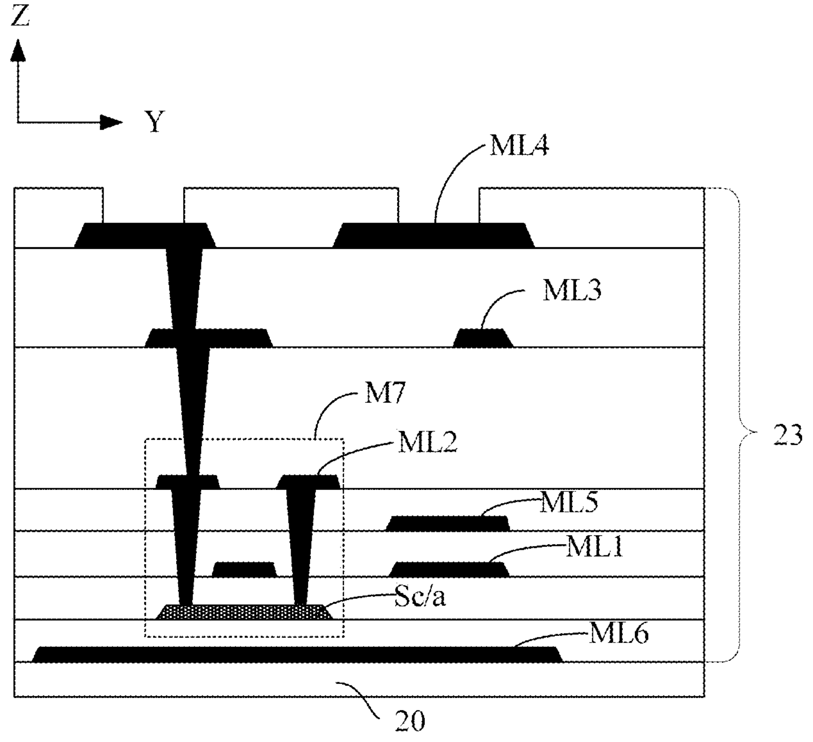
FIG. 32 is a cross-sectional view of another display panel provided in an embodiment of the present application.

Refer to FIG. 32, FIG. 32 is a cross-sectional view of another display panel provided in an embodiment of the present application. FIG. 32 is illustrated by taking the cross-sectional view of the pixel circuit 12 in the YZ plane as an example, and the cross-sectional view is perpendicular to the gate of the second reset transistor M7. Based on any one of the above embodiments, the driving layer 23 may include:

- a semiconductor layer Sc located on the surface of the substrate 20, the semiconductor layer Sc may be polycrystalline silicon, at least used to form the active region a of the transistor and some traces in the circuit;
- a gate metal layer ML1 located on the semiconductor layer Sc, at least used to prepare the gate of the transistor and the signal lines extending along the first direction X, such as the first scanning signal line SL1, the second scanning signal line SL2 and the light-emitting control signal line SL4;

a source-drain metal layer ML2 located above the gate metal layer ML1, at least used to prepare the source-drain electrode of the transistor and the data signal line SL5 and some signal lines extending along the second direction Y;

a first data metal layer ML3 located above the source-drain metal layer ML2, at least used to prepare the transfer line, used to connect the source-drain electrode of the transistor with the electrode connection line of the light-emitting element;

a second data metal layer ML4 located above the first data metal layer ML3, at least used to prepare the electrode connection line connecting the light-emitting element 11; and a capacitor metal layer ML5 located between the gate metal layer ML1 and the source-drain metal layer ML2, at least used to prepare the two plates of the capacitor in the circuit respectively with the gate metal layer ML1.

In the display panel, different metal layers and vias can be used to achieve cross insulation of signal lines to avoid cross short circuits of different signal lines.

Optionally, a light-shielding metal layer ML6 can be disposed on the surface of the substrate 20 corresponding to the active region a of transistor to prevent light from causing leakage current in the active region a of transistor.

In the third direction Z, the light-shielding metal layer ML6, the semiconductor layer Sc, the gate metal layer ML1, the capacitor metal layer ML5, the source-drain metal layer ML2, the first data metal layer ML3, and the second data metal layer ML4 are stacked in sequence above the substrate 20, and there is an insulating layer between the two adjacent layers. Any two of the light-shielding metal layer ML6, the gate metal layer ML1, the capacitor metal layer ML5, the source-drain metal layer ML2, the first data metal layer ML3, and the second data metal layer ML4 can be used to prepare alignment marks.

Since the main function of the light-shielding metal layer ML6 is to block light, its material and structural design optimize the absorption and reflection characteristics of light to achieve this purpose. If the light-shielding metal layer ML6 is used as an alignment mark, the visualization of the alignment mark may be affected during optical detection and imaging, making it difficult to accurately identify and detect the alignment marks. If the first alignment mark 21 is used for alignment in the manufacture of a display panel, it is preferred to prepare the first metal layer with the gate metal layer ML1 for preparing the first alignment mark 21.

In the display panel manufacturing process, the photolithography process is an indispensable step for patterning the film layer structure in the display panel. The gate metal layer ML1 is a bottom metal layer in addition to the light-shielding metal layer ML6. When the gate metal layer ML1 is used to prepare the first alignment mark 21, it can serve as the basis for the alignment of the subsequent graphic structures of each layer above. In other ways, alignment marks in the display panel manufacturing process can also be formed by other metal layers.

As mentioned above, the light-emitting element 11 is a separately prepared micro-LED. The light-emitting element 11 can be prepared in advance, and then the light-emitting element 11 is fixedly transferred above the substrate 20 through a transfer process to be fixed on the driving layer 23 and electrically connected to the pixel circuit 12. In order to improve the accuracy and efficiency of batch transfer, it is necessary to dispose an alignment mark for the transfer process of the light-emitting element 11 above the substrate 20.

If the second alignment mark 22 is used for alignment during the transfer process of the light-emitting element 11, it is preferred to use the uppermost second data metal layer ML4 in the driving layer 23 to prepare the second alignment mark. The alignment mark for the transfer process of the light-emitting element 11 prepared by using the uppermost second data metal layer ML4 in the driving layer 23 can be located at the top, which is convenient for clear identification of the alignment mark, and can also reduce the cumulative error during the transfer process, thereby improving the accuracy of positioning and product yield.

In the embodiments of the present application, as shown in FIG. 1, the display area of the display panel can be divided into three sub-display areas along the first direction X, which are used as the first area AA1, the second area AA2 and the third area AA3 respectively. The arrangement order of the first area AA1, the second area AA2 and the third area AA3 in the first direction X is not limited to the arrangement shown in FIG. 1, and the arrangement order of the three can be set arbitrarily.

Figure 33:
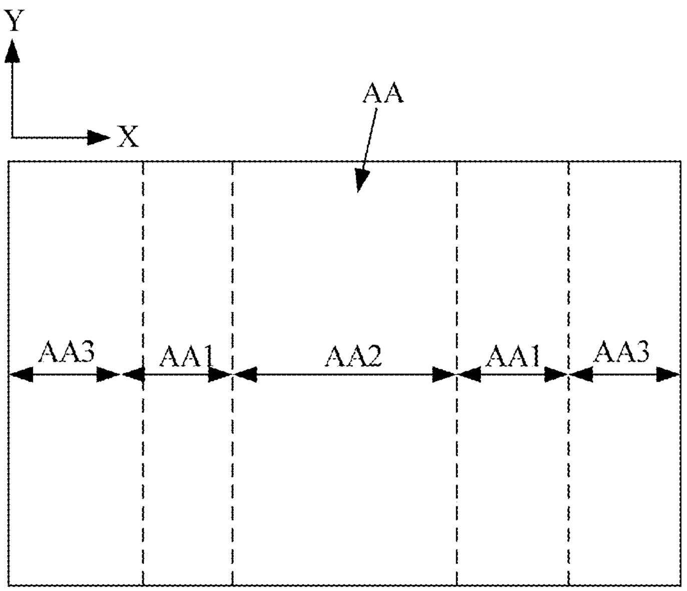
FIG. 33 is a schematic diagram of a display area partition in a display panel provided in an embodiment of the present application.

Referring to FIG. 33, FIG. 33 is a schematic diagram of a display area partition in a display panel provided in an embodiment of the present application, and the display area AA can also be divided into at least five sub-display areas along the first direction X. Among the five sub-display areas arranged continuously, the middle sub-display area is used as the second area AA2, the two sub-display areas on the left and right sides are used as the third area AA3, and the other two sub-display areas are used as the first area AA1. This arrangement can not only dispose the first pixel circuits 121 through the first area AA1 to dispose the driving circuits 13 in the display area AA, but also can respectively layout the driving circuits 13 through the third areas AA3 on the left and right sides to achieve bilateral drive and improve the driving ability.

Figure 34:
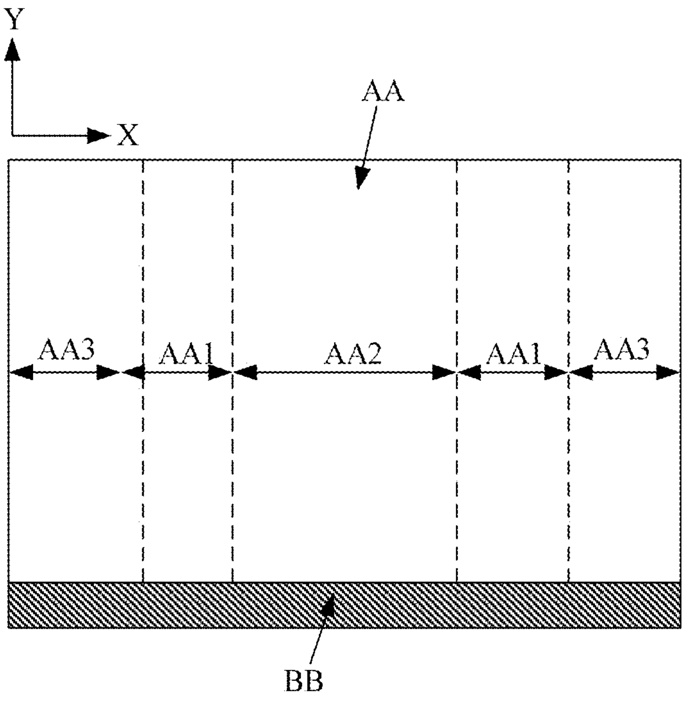
FIG. 34 is a schematic diagram of a display area partition in another display panel provided in an embodiment of the present application.

Referring to FIG. 34, FIG. 34 is schematic diagram of the display area partition in another display panel provided in an embodiment of the present application. If used for a transparent display panel, since the lower step cannot be bent to the back of the display panel, a border area BB needs to be disposed on one side of the display area AA in the second direction Y. This arrangement can achieve a three-side borderless structure.

If used for a non-transparent display panel, the lower step can be bent to the back of the display panel, and this arrangement can achieve a four-side borderless structure.

Figure 35:
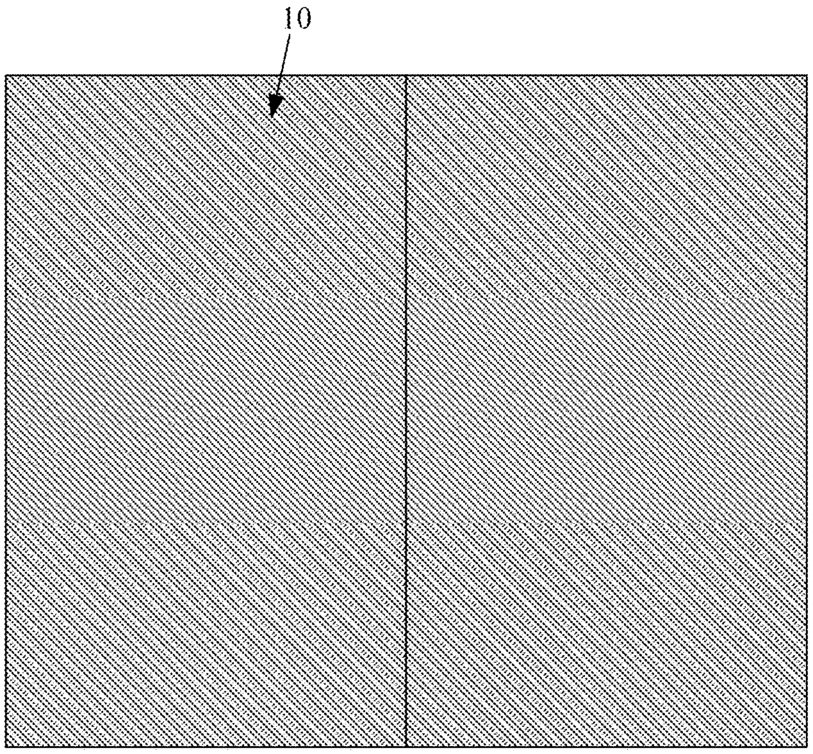
FIG. 35 is a schematic structural diagram of a display apparatus provided in an embodiment of the present application.

Based on any one of the above embodiments, an embodiment of the present application also provides a display apparatus, the display apparatus can be shown in FIG. 35.

Referring to FIG. 35, FIG. 35 is a schematic structural diagram of a display apparatus provided in an embodiment of the present application, and the display apparatus includes a display panel 10 provided in any one of the above embodiments. The display apparatus may include a display panel 10, or include multiple spliced and fixed display panels 10.

When used for a large-size display scene, the display apparatus may include multiple spliced and fixed display panels 10.

The display apparatus uses the display panel 10 provided in the above embodiments, and can dispose the driving circuits 12 in the display area AA, thereby removing the border area of the splicing position at least in the first direction X, and solving the problem that conventional display panels cannot display large-size transparent splicing displays.

The display apparatus can be a large-size electronic display device for indoor and outdoor use, such as a large-screen display device in public places such as squares and stations, or a vehicle-mounted display device, such as a transparent window.

In the specification of the present application, each embodiment is described in a progressive, parallel, or progressive and parallel manner. Each embodiment focuses on the differences from other embodiments, and the same and similar parts between the embodiments can be referred to each other. The embodiments provided in the embodiments of the present application can be combined with each other without contradiction.

It should be noted that in the description of the present application, it should be understood that the description of the drawings and embodiments is illustrative rather than restrictive. The same figure marks throughout the embodiments of the specification identify the same structure. In addition, for the sake of understanding and ease of description, the drawings may exaggerate the thickness of some layers, films, panels, regions, etc. At the same time, it can be understood that when an element such as a layer, film, region or substrate is referred to as "on" another element, the element can be directly on the other element or there can be an intermediate element. In addition, "on . . . " means positioning an element on or below another element, but does not essentially mean positioning on the upper side of another element according to the direction of gravity.

The orientation or position relationship indicated by the terms "upper", "lower", "top", "bottom", "inside", "outside", etc. is based on the orientation or position relationship shown in the drawings, and is only for the convenience of describing the present application and simplifying the description, rather than indicating or implying that the device or element referred to must have a specific orientation, be constructed and operated in a specific orientation, and therefore cannot be understood as a limitation on the present application. When a component is considered to be "connected" to another component, it may be directly connected to another component or there may be a centrally arranged component at the same time.

It should also be noted that in the present application, relational terms such as first and second are only used to distinguish one entity or operation from another entity or operation, and do not necessarily require or imply any such actual relationship or order between these entities or operations. Moreover, the terms "include", "comprise" or any other variant thereof are intended to cover non-exclusive inclusion, so that an article or device including a series of elements includes not only those elements, but also other elements not explicitly listed, or also includes elements inherent to such article or device. In the absence of further restrictions, the elements defined by the sentence "including one . . . " do not exclude the existence of other identical elements in the article or device including the above elements.

The above description of the disclosed embodiments enables those skilled in the art to implement or use the present application. Various modifications to these embodiments will be apparent to those skilled in the art, and the general principles defined herein may be implemented in other embodiments without departing from the gist or scope of the present application. Therefore, the present application will not be limited to the embodiments shown herein, but will conform to the widest scope consistent with the principles and novel features disclosed herein.

What is claimed is:

1. A display panel, comprising:

a light-emitting element; and a pixel circuit and a driving circuit, the driving circuit providing a control signal for the pixel circuit, and the pixel circuit being electrically connected to the light-emitting element, wherein the display panel comprises a first area and a second area, the pixel circuit comprises a first pixel circuit located in the first area and a second pixel circuit located in the second area, a length of the first pixel circuit in a first direction being less than a length of the second pixel circuit in the first direction, or a distance between adjacent two of the first pixel circuits in the first direction being less than a distance between adjacent two of the second pixel circuits in the first direction;

wherein the driving circuit comprises a first driving circuit, the first driving circuit comprising a plurality of first shift registers cascaded along a second direction, the first direction intersecting with the second direction;

wherein in the second direction, the first shift register and the light-emitting element at least partially overlap;

wherein the pixel circuit comprises a driving transistor, a first light-emitting control transistor and a second light-emitting control transistor, a first electrode of the driving transistor is connected to a first power supply terminal through the first light-emitting control transistor, and a second electrode of the driving transistor is connected to the light-emitting element through the second light-emitting control transistor; and wherein in the first pixel circuit, a distance between the first light-emitting control transistor and the driving transistor in the second direction is D11, and a distance between the second light-emitting control transistor and the driving transistor in the second direction is D12, in the second pixel circuit, a distance between the first light-emitting control transistor and the driving transistor in the second direction is D21, and a distance between the second light-emitting control transistor and the driving transistor in the second direction is D22, wherein D11<D12, or D21=D22.

2. The display panel according to claim 1, wherein the driving transistor comprises at least a first sub-transistor and a second sub-transistor, a gate of the first sub-transistor is connected to a gate of the second sub-transistor, a first electrode of the first sub-transistor is connected to a first electrode of the second sub-transistor, and a second electrode of the first sub-transistor is connected to a second electrode of the second sub-transistor.

3. The display panel according to claim 2, wherein in the first pixel circuit, the first sub-transistor and the second sub-transistor are arranged along the second direction;

in the second pixel circuit, the first sub-transistor and the second sub-transistor are arranged along the first direction.

4. The display panel according to claim 2, wherein $$|D11-D12|>|D21-D22|.$$

5. The display panel according to claim 2, wherein the pixel circuit further comprises a first reset transistor, a gate of the first reset transistor is connected to a first scanning signal line, a first electrode of the first reset transistor is connected to a reset signal line, and a second electrode of the first reset transistor is connected to a gate of the driving transistor;

the reset signal line is located on a side of the first scanning signal line away from the driving transistor.

6. The display panel according to claim 5, wherein the first electrode of the first reset transistor and the reset signal line are both connected to a first connection portion; the first connection portion and the first scanning signal line partially overlap.

7. The display panel according to claim 2, wherein the pixel circuit further comprises a data writing transistor and a threshold compensation transistor, a first electrode of the data writing transistor is connected to a first electrode of the driving transistor, and a second electrode of the data writing transistor is connected to a data line;

a first electrode of the threshold compensation transistor is connected to a gate of the driving transistor, and a second electrode of the threshold compensation transistor is connected to a second electrode of the driving transistor;

in the first pixel circuit, a distance between the data writing transistor and the threshold compensation transistor in the first direction is D1;

in the second pixel circuit, a distance between the data writing transistor and the threshold compensation transistor in the first direction is D2, wherein $$D1<D2.$$

8. The display panel according to claim 2, wherein the pixel circuit further comprises a first reset transistor and a second reset transistor, the first reset transistor is connected to a gate of the driving transistor, and is configured to provide a first reset signal to the gate of the driving transistor, and the second reset transistor is connected to a first electrode of the light-emitting element, and is configured to provide a second reset signal to the first electrode of the light-emitting element;

in the first pixel circuit, a gate of the first reset transistor is connected to a first scanning signal line, and a gate of the second reset transistor is connected to a second scanning signal line;

in the second pixel circuit, a gate of the first reset transistor is connected to the first scanning signal line, and a gate of the second reset transistor is connected to the first scanning signal line.

9. The display panel according to claim 8, wherein the second scanning signal line connected to the first pixel circuit at an i-th row is reused as the first scanning signal line of the first pixel circuit at an i+1-th row, and i is a positive integer.

10. The display panel according to claim 9, wherein in the first pixel circuit, a distance between the first reset transistor and the driving transistor in the second direction is D31, and a distance between the second reset transistor and the driving transistor in the second direction is D32;

in the second pixel circuit, a distance between the first reset transistor and the driving transistor in the second direction is D41, and a distance between the second reset transistor and the driving transistor in the second direction is D42; wherein $$|D31-D32|>|D41-D42|.$$

11. The display panel according to claim 8, wherein in the first pixel circuit, a distance between the second reset transistor and the driving transistor in the second direction is D32;

in the second pixel circuit, a distance between the second reset transistor and the driving transistor in the second direction is D42;

wherein D32>D42.

12. The display panel according to claim 8, wherein the pixel circuit further comprises a second light-emitting control transistor, and a second electrode of the driving transistor is connected to the light-emitting element through the second light-emitting control transistor;

in the first pixel circuit, a second electrode of the second reset transistor is connected to a second electrode of the second light-emitting control transistor through a second connection portion;

in the second pixel circuit, a second electrode of the second reset transistor is connected to a second electrode of the second light-emitting control transistor through a third connection portion;

a length of the second connection portion in the second direction is greater than a length of the third connection portion in the second direction.

13. The display panel according to claim 8, wherein in the second pixel circuit, a first electrode of the first reset transistor is connected to a first electrode of the second reset transistor through a fourth connection portion; and the fourth connection portion is connected to a reset signal line through a first connection portion.

14. The display panel according to claim 1, wherein a length of the first shift register in the second direction is greater than a length of the first shift register in the first direction.

15. The display panel according to claim 14, wherein the first shift register comprises a first output module, the first output module comprises a first output transistor and a second output transistor; wherein a channel length direction of the first output transistor is parallel to the first direction, and a channel width direction of the first output transistor is parallel to the second direction; or, a channel length direction of the second output transistor is parallel to the first direction, and a channel width direction of the second output transistor is parallel to the second direction.

16. The display panel according to claim 15, wherein the first shift register further comprises a first switch module, and along the second direction, the first switch module is located between the first output transistor and the second output transistor.

17. The display panel according to claim 14, wherein the first driving circuit provides a light-emitting control signal for a light-emitting control transistor of the pixel circuit.

18. The display panel according to claim 1, wherein the display panel comprises a first pixel column, a second pixel column and a first circuit column sequentially arranged along the first direction;

the first pixel column comprises pixels arranged along the second direction, the second pixel column comprises pixels arranged along the second direction, and the first circuit column comprises a pixel circuit group arranged along the second direction;

the display panel further comprises a first anode connection line, the first anode connection line connects the pixels in the first pixel column to the pixel circuits in the pixel circuit group of the first circuit column;

the first anode connection line overlaps the second pixel column.

19. A display apparatus, comprising a display panel comprising:

a light-emitting element; and a pixel circuit and a driving circuit, the driving circuit providing a control signal for the pixel circuit, and the pixel circuit being electrically connected to the light-emitting element, wherein the display panel comprises a first area and a second area, the pixel circuit comprises a first pixel circuit located in the first area and a second pixel circuit located in the second area, a length of the first pixel circuit in a first direction being less than a length of the second pixel circuit in the first direction, or a distance between adjacent two of the first pixel circuits in the first direction being less than a distance between adjacent two of the second pixel circuits in the first direction;

wherein the driving circuit comprises a first driving circuit, the first driving circuit comprising a plurality of first shift registers cascaded along a second direction, the first direction intersecting with the second direction;

wherein in the second direction, the first shift register and the light-emitting element at least partially overlap;

wherein the pixel circuit comprises a driving transistor, a first light-emitting control transistor and a second light-emitting control transistor, a first electrode of the driving transistor is connected to a first power supply terminal through the first light-emitting control transistor, and a second electrode of the driving transistor is connected to the light-emitting element through the second light-emitting control transistor; and wherein in the first pixel circuit, a distance between the first light-emitting control transistor and the driving transistor in the second direction is D11, and a distance between the second light-emitting control transistor and the driving transistor in the second direction is D12, in the second pixel circuit, a distance between the first light-emitting control transistor and the driving transistor in the second direction is D21, and a distance between the second light-emitting control transistor and the driving transistor in the second direction is D22, wherein D11<D12, or D21=D22.

* * * * *